United States Patent [19]

Chang

[11] Patent Number: 4,543,651
[45] Date of Patent: Sep. 24, 1985

[54] DUPLICATED TIME DIVISION SWITCHING SYSTEM

[75] Inventor: Shih-Jeh Chang, Naperville, Ill.

[73] Assignee: AT&T Bell Laboratories, Murray Hill, N.J.

[21] Appl. No.: 531,485

[22] Filed: Sep. 12, 1983

[51] Int. Cl.[4] ............................. H04J 1/16; H04J 3/14
[52] U.S. Cl. ........................................................ 370/16
[58] Field of Search ............................. 370/13, 16, 54; 179/175.2 R

[56] References Cited

U.S. PATENT DOCUMENTS

| | | | |
|---|---|---|---|
| 3,974,340 | 8/1976 | Ghisler | 179/15 |
| 4,197,523 | 4/1980 | Philip et al. | 371/49 |
| 4,213,201 | 7/1980 | Gagnier et al. | 370/62 |
| 4,228,535 | 10/1980 | Workman et al. | 370/16 |
| 4,254,498 | 3/1981 | Tawara et al. | 370/16 |
| 4,345,324 | 8/1982 | Smitt | 370/14 |
| 4,382,294 | 5/1983 | Beuscher et al. | 370/16 |
| 4,413,335 | 11/1983 | Clements et al. | 370/16 |

FOREIGN PATENT DOCUMENTS

| | | |
|---|---|---|
| 2182288 | 12/1973 | France . |
| 2233780 | 1/1975 | France . |
| 1447713 | 8/1976 | United Kingdom . |

OTHER PUBLICATIONS

J. N. A. Risbridger, *The Post Office Electrical Engineer,* "System X: Subsystems—Part 1—The Digital Switching Subsystem", vol. 73, Apr. 1980, pp. 19–26.

*Primary Examiner*—Douglas W. Olms
*Assistant Examiner*—Kenneth I. Rokoff
*Attorney, Agent, or Firm*—Kenneth H. Samples; Ross T. Watland

[57] ABSTRACT

A duplicated switching system including a number of communication units wherein each digital word transmitted by an originating communication unit is conveyed via both of the duplicate time-multiplexed switches in the system and a destination communication unit autonomously selects the digital words to be used for further communication based upon whether the word error check portions can be derived from the word information portions. Advantageously, the system continues to operate in the presence of system faults not simultaneously affecting digital words from both time-multiplexed switches without any erroneous words being used for further communication and without involving a system central control.

26 Claims, 18 Drawing Figures

| OUTPUT OF AND GATE 918 | OUTPUT OF AND GATE 928 | OUTPUT OF PREVIOUS SELECTION MEMORY 950 | OUTPUT OF OR GATE 935 |
|---|---|---|---|
| 0 | 0 | 0 | 0 |
| 0 | 1 | 0 | 1 |
| 1 | 0 | 0 | 0 |
| 1 | 1 | 0 | 0 |
| 0 | 0 | 1 | 1 |
| 0 | 1 | 1 | 0 |
| 1 | 0 | 1 | 1 |

FIG. 15
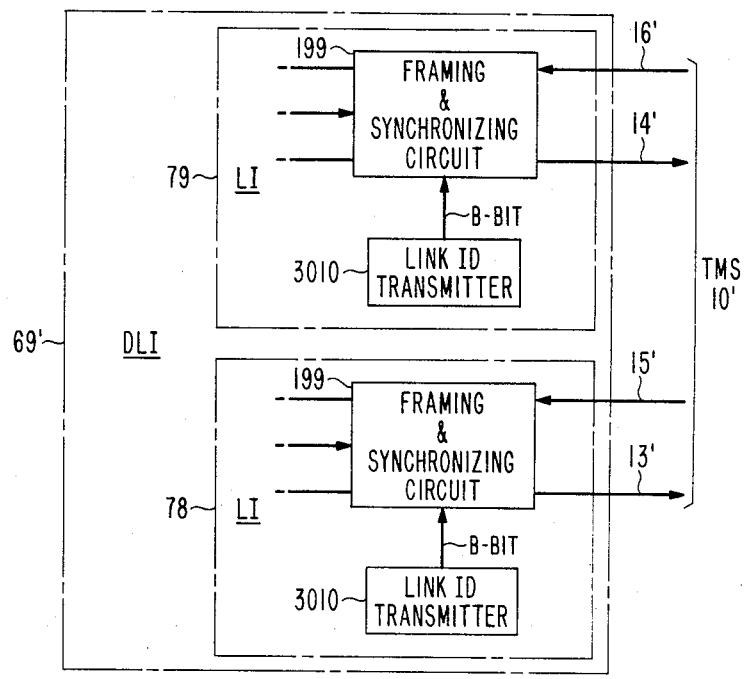
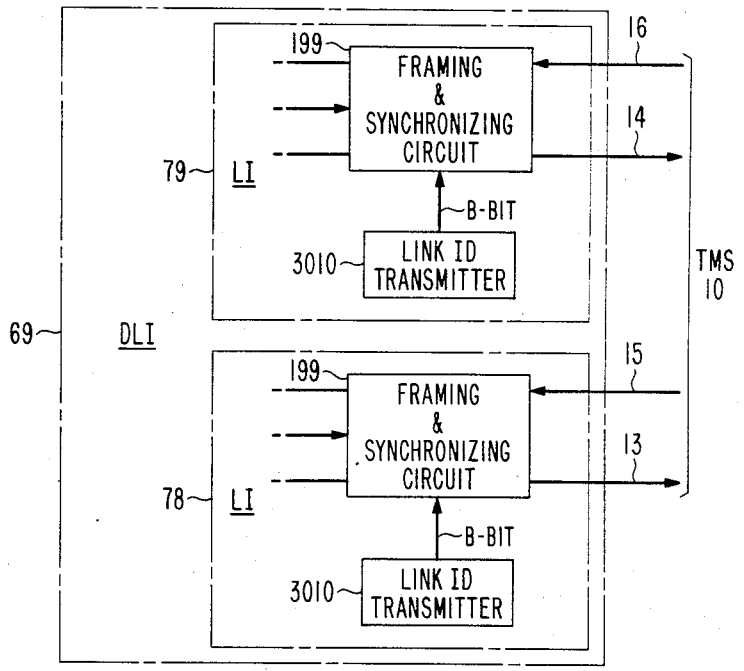

DUPLICATED TIME DIVISION SWITCHING SYSTEM

TECHNICAL FIELD

This invention relates to time division switching systems and, more particularly, to such systems having redundant equipment.

BACKGROUND OF THE INVENTION

The high reliability goals typically set for communication switching systems are frequently met by implementing those systems with redundant hardware. For example, redundant switching networks can be included in such systems wherein an active network handles all traffic until the system detects a failure of that network. A standby network then becomes active and handles traffic while the failure is diagnosed and corrective measures are taken.

In one known duplicated switching system, digital words are conveyed among a number of communication units in time-multiplexed channels by an active time-multiplexed switch. The duplicate time-multiplexed switch is designated standby. However, each digital word transmitted from an originating communication unit to a destination communication unit via the active time-multiplexed switch is also transmitted via separate interface and communication link hardware through the standby time-multiplexed switch. Although digital words are transmitted through the standby time-multiplexed switch to the destination communication unit, those digital words are not used for further communication. In this known system, when a fault develops, for example, in the communication link hardware between one communication unit and the active time-multiplexed switch, all of the communication units, under the control of a central control, begin using the digital words from the other time-multiplexed switch for communication. Not only does this change require a good deal of coordination between the central control and the communication units but it also leaves the system vulnerable to the occurrence of a second fault of this type before the first one can be repaired resulting in a complete system outage.

In a second known duplicated switching system, digital words are conveyed among communication units in time-multiplexed channels by duplicate time-multiplexed switches and a select bit is included with each digital word conveyed. For example, a digital word representing a given speech sample and including a select bit of a first logic value may be conveyed by the first time-multiplexed switch while a digital word representing the same given speech sample but having a select bit of a second logic value is conveyed by the second time-multiplexed switch. Both time-multiplexed switches transmit the digital words to the destination communication unit. However, a logic circuit in the destination communication unit selects only those digital words having select bits of the first logic value to be used for further communication. When the switching system central control detects system faults affecting, for example, only the digital words transmitted by a given originating communication unit and conveyed by the first time-multiplexed switch, the central control controls the select bits of the digital words conveyed by the time-multiplexed switches such that destination communication units use only the digital words from the given originating communication unit that are conveyed via the second time-multiplexed switch. However, in applications where the reliability of communication is important, e.g., data communication, the time needed for the central control of such a system to detect a fault and to appropriately control the select bits is sufficiently long that complex error detection/correction or data retransmission methods must be used to recover from the errors that occur before such central control measures become effective. In view of the foregoing, a recognized problem in the art is the additional complexity required to achieve highly reliable communication through a duplicated switching system when the responsibility for fault recovery lies solely with the system central control.

SUMMARY OF THE INVENTION

The aforementioned problem is advantageously solved and a technical advance is achieved in accordance with the principles of the invention in an arrangement wherein a destination communication unit receiving digital words from duplicate time-multiplexed switches continues to operate in the presence of system faults not simultaneously affecting digital words from both time-multiplexed switches, without any erroneous digital words being used for communication and without involving a central control. The destination communication unit autonomously selects the digital words that are to be used for communication based upon whether the digital word error check portions can be derived from the information portions.

An arrangement in accordance with the invention includes a transmitter that transmits digital words comprising an information portion and an error check portion derived from that information portion on both a first communication path and a second communication path. The arrangement further includes a selection arrangement that receives a first digital word from the first communication path and a second digital word from the second communication path and transmits either the first digital word or the second digital word to a third communication path. The first digital word is transmitted to the third communication path unless the error check portion of the first digital word cannot be derived from the information portion and the error check portion of the second digital word can be derived from the information portion. The second digital word is transmitted to the third communication path when the error check portion of the first digital word cannot be derived from the information portion and the error check portion of the second digital word can be derived from the information portion.

In accordance with a second aspect of the invention, error checkers are included within the duplicate time-multiplexed switches and the digital word selections made by the destination communication units are based upon whether the logic value of a validity bit included in the information portion of each digital word is a predetermined logic value. When an error checker in a given time-multiplexed switch detects an erroneous digital word, the error check portion and the validity bit of that digital word are modified as necessary such that the error check portion can be derived from the information portion but the validity bit is not the predetermined logic value. Continuous error-free operation is advantageously maintained in the presence of certain system faults as before without involving a central control and in addition a controller included in each time-multiplexed switch is capable of determining whether a fault is located before or after the error checker. Alternatively, the number of errors detected by each of the error checkers of a given time-multiplexed switch is monitored and the validity bits of digital words conveyed to destination communication units are modified only after a predetermined number of errors are detected.

BRIEF DESCRIPTION OF THE DRAWING

A more complete understanding of the present invention may be obtained from a consideration of the following description when read in conjunction with the drawing in which:

FIG. 15 and 16 are diagrams of portions of a fourth embodiment of the present invention.

GENERAL DESCRIPTION

Figure 1:
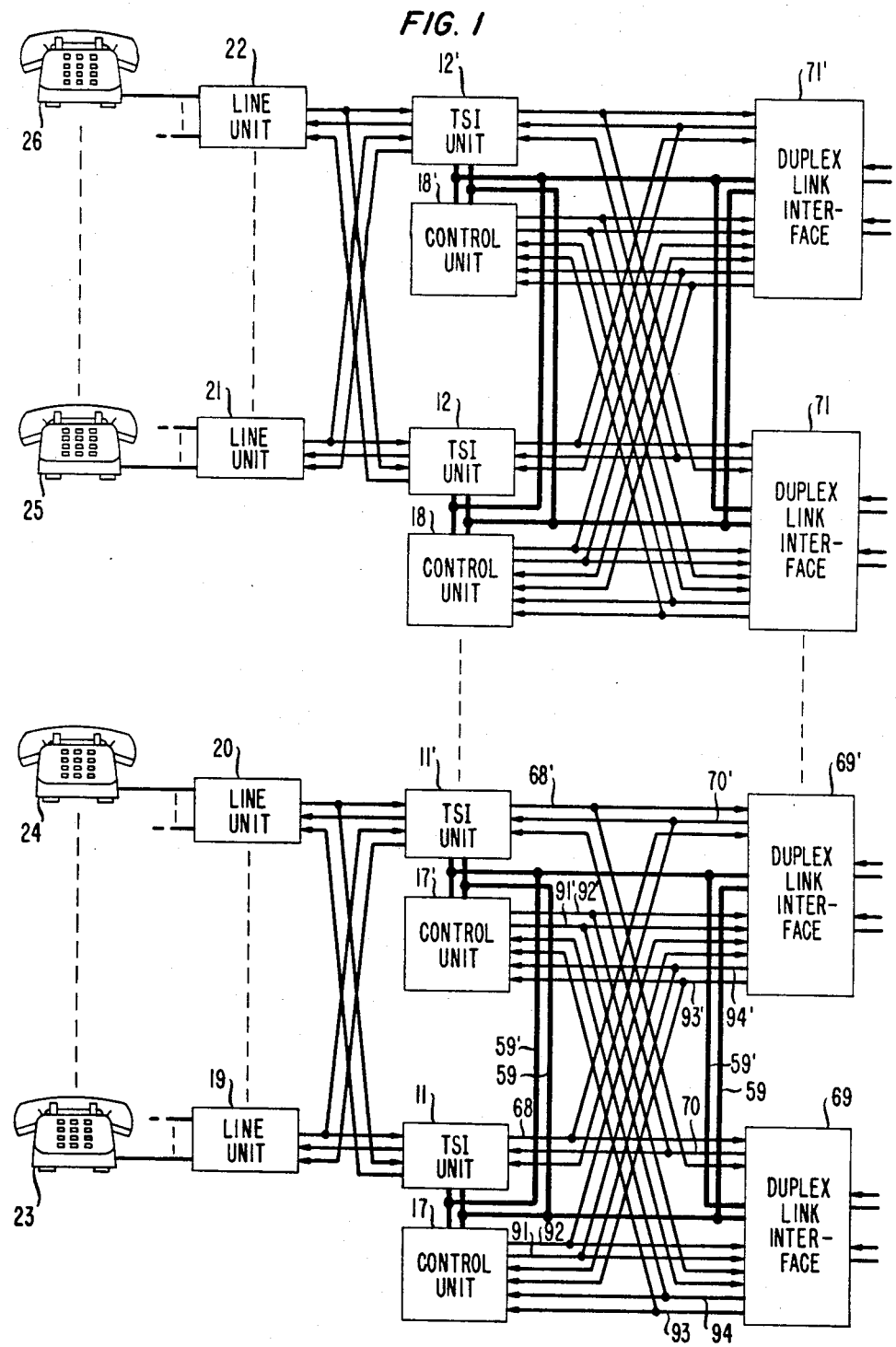
FIG. 1 and 2, when arranged in accordance with FIG. 17, present a block diagram of a duplicated time division switching system illustrating the principles of the present invention.
Figure 2:
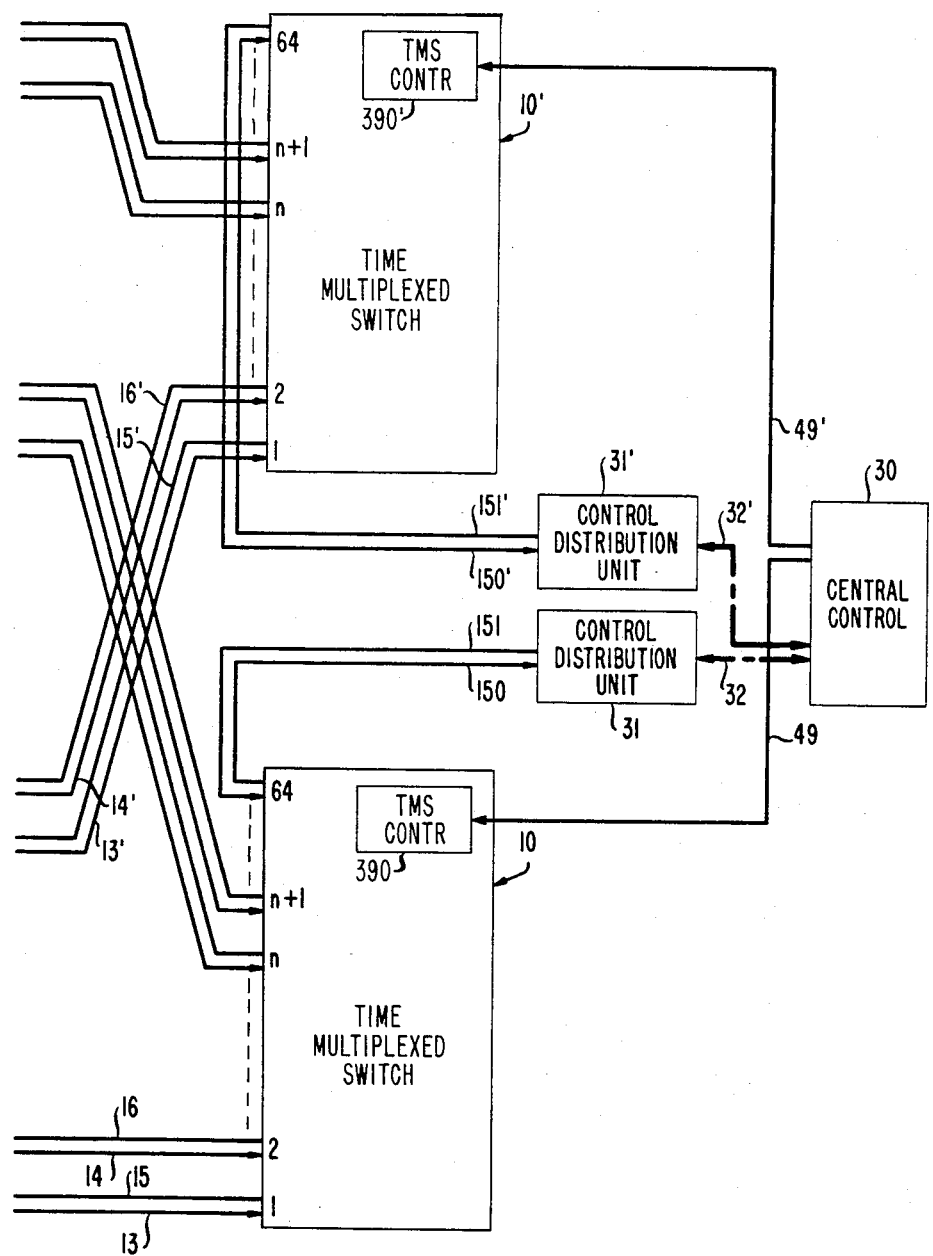

FIG. 1 and 2, when arranged in accordance with FIG. 17, show a duplicated, time division switching system embodying the present invention which is used to interconnect subscriber sets such as subscriber sets 23 through 26. The embodiment of FIG. 1 and 2 includes time-multiplexed switches 10 and 10' each comprising a time-shared space division switch having 64 input ports and 64 output ports. The embodiment further includes 31 pairs of time-slot interchange units of which representative pairs 11, 11' and 12, 12' are specifically shown. Each time-slot interchange unit 11, 11', 12 and 12' includes a bidirectional time-slot interchanger. At any given time, only one of each pair of time-slot interchange units is designated as active, the other unit being designated standby. The active one of time-slot interchange units 11 and 11' transmits data words to two input ports and receives data words from two output ports of each of the time-multiplexed switches 10 and 10' via a pair of duplex link interfaces 69 and 69'. Similarly, the active one of time-slot interchange units 12 and 12' transmits data words to two input ports and receives data words from two output ports of each of the time-multiplexed switches 10 and 10' via a pair of duplex link interfaces 71 and 71'. In the present embodiment, time-slot interchange unit 11 is connected to duplex link interface 69 by two time-multiplexed lines 68 and 70 and then to two input ports of time-multiplexed switch 10 via two time-multiplexed lines 13 and 14 and to two output ports of time-multiplexed switch 10 via two time-multiplexed lines 15 and 16. Time-slot interchange unit 11 is also connected to duplex link interface 69' by time-multiplexed line 68 and a time-multiplexed line 70' and then to two input ports of time-multiplexed switch 10' via two time-multiplexed lines 13' and 14' and to two output ports of time-multiplexed switch 10' via two time-multiplexed lines 15' and 16'. Similarly, time-slot interchange unit 11' is connected to duplex link interface 69' by two time-multiplexed lines 68' and 70' and then to time-multiplexed switch 10' via time-multiplexed lines 13', 14', 15' and 16'. Time-slot interchange unit 11' is also connected to duplex link interface 69 by time-multiplexed lines 68' and 70 and then to time-multiplexed switch 10 via time-multiplexed lines 13, 14, 15 and 16. When, for example, time-slot interchange unit 11 is designated active, it transmits data words to both duplex interfaces 69 and 69' and receives data words from both duplex link interfaces 69 and 69'. In accordance with this exemplary embodiment of the present invention, time-slot interchange unit 11 selects from each pair of data words received from the duplex link interfaces 69 and 69', only one data word that is to be used for further communication. The selection is based on validity and parity bits included in the data words. The data words comprising each pair of data words received from the duplex link interfaces 69 and 69' typically have been transmitted by the same time-slot interchange unit and represent the same speech sample but have been conveyed by different time-multiplexed switches. Standby time-slot interchange unit 11' also receives the pairs of data words transmitted by the duplex link interfaces 69 and 69' and performs a similar word selection operation. However, none of the data words received by standby time-slot interchange unit 11' are used for further communication.

In the description which follows, the input and output ports of time-multiplexed switches 10 and 10' are referred to as input/output port pairs. This term is used since the source for data words to an input port of a given input/output port pair is also the destination for data words from the output port of that pair. As shown in FIG. 1 and 2, input/output port pair 1 of time-multiplexed switch 10 is associated with time-multiplexed lines 13 and 15. Each time-multiplexed line 13 through 16 and 13' through 16' conveys digital information in 125-microsecond frames each comprising 256 time separated channels. Accordingly, each active time-slot interchange unit transmits and receives up to 512 channels of digital information during each 125-microsecond frame.

Figures 9, 10:
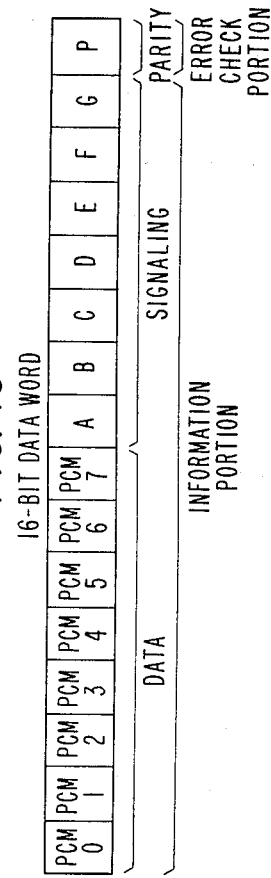
FIG. 9 is a truth table for a logic circuit included in the selection circuit of FIG. 8.
FIG. 10 is a diagram illustrating the data word format used in the system of FIG. 1 and 2.

Each pair of time-slot interchange units is uniquely associated with a pair of control units of which control units 17 and 17' are associated with time-slot interchange units 11, and 11', and control units 18 and 18' are associated with time-slot interchange units 12 and 12'. At any given time, both time slot interchange units of a pair operate under the control of one control unit of the associated pair of control units, that control unit being designated as active. Additionally, each time-slot interchange unit is connected to a plurality of line units of which line units 19 through 22 are shown in FIG. 1 and 2 via individual time-multiplexed lines. In the present embodiment line units 19 and 20 are connected to time-slot interchange units 11 and 11' and line units 21 and 22 are connected to time-slot interchange units 12 and 12'. Each of the line units of the present embodiment is connected to a number of subscriber sets of which subscriber sets 23 through 26 are shown. The exact number of line units associated with each time-slot interchange unit and the exact number of subscriber sets associated with each line unit is determined by the number of subscribers to be served and the calling rates of those subscribers. Each line unit terminates the analog loop of the well-known type from a plurality of subscriber sets, e.g., 23 through 26, and converts call information including analog speech signals into digital data words which are transmitted to its associated time-slot interchange units. Further, each line unit detects service requests from the subscriber sets and generates certain signaling information for those subscriber sets. The particular subscriber sets from which speech samples are taken and encoded, and the particular time-multiplexed channels used to transmit the resulting code between the line unit and its associated time-slot interchange units are determined by the active control unit. The digital words transmitted to the time-slot interchange units are, as shown in FIG. 10, 16 bits in length comprising an 8-bit PCM data portion, a 7-bit signaling portion and a parity bit. The signaling portion is used to convey signaling information about the line unit or a subscriber set to which it is connected. For example, the A-bit of the signaling portion is used to transmit the present DC state of an associated subscriber set to time-slot interchange unit 11. In the present embodiment, the C-bit is referred to as a validity bit and is used in accordance with the invention by the active time-slot interchange unit to select from each pair of data words received from duplex link interfaces 69 and 69' the one data word that is to be used for further communication. The 15 bits comprising the 8-bit PCM data portion and the 7-bit signaling portion are also referred to collectively herein as the information portion and the parity bit is referred to more generally as the error check portion.

The relationship of subscriber sets, line units, time-slot interchange units, and duplex link interfaces is substantially the same for each of such groups of interconnected units. Accordingly, while the description which follows relates directly to subscriber set 23, line unit 19, time-slot interchange units 11 and 11' and duplex link interfaces 69 and 69', it shows the relationships for all other groups of such units. Assume for the present example that time-slot interchange unit 11 and control unit 17 are designated active and time-slot interchange unit 11' and control unit 17' are designated standby. Line unit 19 scans the lines connected to each subscriber set to detect requests for service. When such a request is detected, line unit 19 transmits a message to control unit 17 indicating the request and the identity of the requesting subscriber set. Control unit 17 performs the necessary translation based on the service requested, the identity of the requesting subscriber set and the available equipment, and transmits a message to line unit 19 defining which of the plurality of time separated channels between line unit 19 and time-slot interchange unit 11 is to be used to transmit information from subscriber set 23 to time-slot interchange unit 11. Based on this message, line unit 19 encodes the analog information from subscriber set 23 into digital data words and transmits the resulting data words in the assigned channels.

After a time-separated channel between line unit 19 and time-slot interchange unit 11 is assigned to a given subscriber set, control unit 17 detects signaling information from the subscriber set by sampling the information transmitted in the assigned channel. Control unit 17 responds to the signaling information from the subscriber's channel, and to control messages from other control units, e.g., 18, and a central control 30, by controlling the time-slot interchange function of the time-slot interchange unit 11. The appropriately rearranged data words are then transmitted to duplex link interfaces 69 and 69' which are associated with time-multiplexed switches 10 and 10', respectively. As previously stated, each time-multiplexed line between a duplex link interface and one of the time-multiplexed switches 10 and 10' has 256 channels each 125-microsecond frame. These channels are assigned numerical designations from 1 to 256 in sequence as they occur. This sequence of channels recurs so that a given channel will be available every 125 microseconds. The time-slot interchange and duplex link interface functions take the data words received from the line units and place them in channels on the time-multiplexed lines between the duplex link interfaces and time-multiplexed switches under the control of control unit 17.

Time-multiplexed switches 10 and 10' are substantially identical and each operates in recurring frames of time slots where each 125-microsecond frame comprises 256 time slots. During each time slot, time-multiplexed switch 10, for example, is capable of connecting data words received at any of its 64 input ports to any of its 64 output ports in accordance with time-slot control information stored by a time-multiplexed switch controller 390. The configuration pattern of connections through time-multiplexed switch 10 repeats itself every 256 time slots and each time slot is assigned a numerical designation in sequence from 1 to 256. Accordingly, during a first time slot TS1 the information in a channel (1) on time-multiplexed line 13 may be switched by time-multiplexed switch 10 to an output port 64 while during the next time slot TS2 the next channel (2) on time-multiplexed line 13 may be switched to an output port n. Time-slot control information is written into time-multiplexed switch controller 390 via a communication path 49 by central control 30 which derives this control information from control messages obtained from various control units, e.g., 17 and 18. The same time-slot control information that is written into time-multiplexed switch controller 390 is also written into a time-multiplexed switch controller 390' in time-multiplexed switch 10' via a communication path 49'.

Central control 30 and the control units 17 and 18 exchange control messages utilizing selected channels called control channels of the time-multiplexed lines, e.g., 13 through 16 and 13' through 16', between the duplex link interfaces and time-multiplexed switches. In the present embodiment, each control message comprises a plurality of control words and each control channel can transmit one control word per frame of 256 time-separated channels. The same channel of the two time-multiplexed lines associated with a given input-/output port pair is predefined to be a control channel. Additionally, a given channel is used as a control channel for only one pair of time-multiplexed lines to a given time-multiplexed switch. For example, if channel 1 is used as a control channel on time-multiplexed line 13 and the associated time-multiplexed line 15, no other time-multiplexed line to time-multiplexed switch 10 will use channel 1 as a control channel. Similarly, if channel 1 is used as a control channel on time-multiplexed line 13' and the associated time-multiplexed line 15', no other time-multiplexed line to time-multiplexed switch 10' will use channel 1 as a control channel. During each time slot having the same numerical designation as a control channel, time-multiplexed switch 10 connects the digital word occupying that control channel to the 64th output port and connects the 64th input port to the output port associated with the above-mentioned control channel. The following is an example of the operation of the present embodiment when channel 1 is the control channel for time-multiplexed lines 13 and 15, and channel 2 is the control channel for time-multiplexed lines 14 and 16. During time slot TS1 information from time-multiplexed switch controller 390 defines, among other connections, that the control word in channel 1 of time-multiplexed line 13 is connected to output port 64 and that the control word in channel 1 at input port 64 is connected to time-multiplexed line 15. Similarly, during time slot TS2, information from time-multiplexed switch controller 390 defines that the control word in channel 2 of time-multiplexed line 14 is connected to the output port 64 and that the control word in channel 2 at the input port 64 is connected to time-multiplexed line 16. When operating in this manner, output port 64 receives from time-multiplexed switch 10 all control words in a channel having the same numerical designation in which they were transmitted to time-multiplexed switch 10. Further, each control channel is connected to receive control words from input port 64 during the time slot having the same numerical designation as their associated control channel. Control words switched to the 64th output port are transmitted to a control distribution unit 31 which temporarily stores them in a location associated with that control channel. The association of control channels with storage locations in control distribution unit 31 identifies the source of the information stored.

Each control message from a control unit, e.g. 17, comprises a start character, a destination portion, a signaling information portion, and an end character. The destination portion uniquely defines the expected destination of the control message. Control distribution unit 31 interprets the destination portion of each control message to determine the proper destination for the control message and retransmits the message to input port 64 of time-multiplexed switch 10 in a channel having the same numerical designation as the control channel associated with the destination unit.

When operating as above-described, control unit 17 transmits control messages to control unit 18 by transmitting control words during its recurring control channel to form a control message having a destination portion identifying control unit 18. Control distribution unit 31 accumulates the control words, interprets the destination portion, and retransmits the message to the input port 64 during the channel having the same numerical designation as the control channel associated with control unit 18. A control message can also be transmitted to the central control 30 by defining central control 30 in the destination portion of the control message. When this occurs, control distribution unit 31 transmits the message to central control 30 via a communication link 32 rather than returning it to time-multiplexed switch 10. Similarly, a message may be transmitted from central control 30 to one of the control units by transmitting to the control distribution unit 31 a control message having a destination portion defining the particular control unit, e.g. 17. This transmission is also accomplished utilizing communication link 32. The operation of a control distribution unit 31' with respect to time-multiplexed switch 10' and central control 30 is substantially identical to that of control distribution unit 31 with respect to time-multiplexed switch 10 and central control 30. One embodiment of the substantially identical control distribution units 31 and 31' is described in U. S. Pat. No. 4,280,217 issued to E. H. Hafer et. al. The functions of control distribution units 31 and 31' may also be advantageously accomplished by a software implementation using microprocessors and associated buffer memories.

Each of the control units of a given pair of control units, e.g., 17, 17', includes a memory 57 (FIG. 3) which stores the program for the control of its associated control unit and data regarding the primary function of the control unit, its associated time-slot interchange unit and its associated subscribers. Memory 57 stores such information as class of service, the subscriber limits for gain or attenuation, toll screening information, and information relating to changes in normal call handling procedures, e.g., terminating party hold or joint hold. Much of the contents of the given memory 57 is not stored in memory locations associated with any other pair of control units or the central control. It may, however, be stored in a bulk memory (not shown) for maintenance purposes. Some of the information in memory 57, e.g., terminating party or joint hold information, relates primarily to functions performed by other control units. This information is stored in association with the subscriber to which it relates to avoid data replication and to avoid the inefficiencies of centralized storage of such information. The previously described arrangement utilizing control channels transmitted through the control distribution unit 31 is utilized to send this call related information to other control units and the central control.

To gain an understanding of the interaction of the various duplicated parts of the system, assume that time-slot interchange unit 11 and control unit 17 are designated active and that time-slot interchange unit 11' and control unit 17' are designated standby. Active time-slot interchange unit 11 transmits data words received from line units to both duplex link interfaces 69 and 69' via 512-channel time-multiplexed line 68. Standby time-slot interchange unit 11' similarly transmits data words to both duplex link interfaces 69 and 69' via 512-channel time-multiplexed line 68'. The data words transmitted by time-slot interchange units 11 and 11' include logic one validity bits. Each duplex link interface 69 and 69' selects, under the control of control unit 17, the one of the time-multiplexed lines 68 and 68' connected to the active time-slot interchange unit—in the present example, line 68—from which data words are to be used for further transmission. Active control unit 17 transmits two control words per frame, one word on each of two conductors 91 and 92, to both duplex link interfaces 69 and 69'. Standby control unit 17' is connected to both duplex link interfaces 69 and 69' via two conductors 91' and 92', which are used to transmit control words when control unit 17' is active. Logic zeroes are present on conductors 91' and 92' when control unit 17' is standby. Each duplex link interface 69 and 69' selects under the control of control unit 17, two of the four conductors 91, 92, 91', 92' from which control words are to be used for further transmission. For example, duplex link interface 69 may select conductors 91 and 92' and duplex link interface 69' may select conductors 91' and 92. Each duplex link interface, e.g., 69, splits the data words received on 512-channel time-multiplexed line 68 for transmission to the associated time-multiplexed switch 10 on two 256-channel time-multiplexed lines. Duplex link interface 69 then inserts the control word received from control unit 17 on conductor 91 in time slot TS1 (control channel 1) on 256-channel time-multiplexed line 13 and inserts the logic zero received from control unit 17' on conductor 92' in time slot TS2 (control channel 2) on 256-channel time-multiplexed line 14. Similarly, duplex link interface 69' inserts the logic zero received from control unit 17' on conductor 91' in time-slot TS1 on 256-channel time-multiplexed line 13' and inserts the control word received from control unit 17 on conductor 92 in time slot TS2 on 256-channel time-multiplexed line 14'.

As has been discussed, both time-multiplexed switches 10 and 10' cycle through the same pattern of connections between ports under the control of time-multiplexed switch controllers. The parity of each of the digital words received by a given time-multiplexed switch, e.g., 10, is checked. If a given digital word is determined to have incorrect parity, the validity bit (C-bit) of that digital word is changed from a logic one to a logic zero and a new parity bit is generated before the digital word is transmitted to a time-shared space division switch 108 (FIG. 7) included in time-multiplexed switch 10. Similarly, the parity of each of the digital words transmitted by time-shared space division switch 108 (FIG. 7) is also checked. Again, if a given digital word transmitted by time-shared space division 108 is determined to have incorrect parity, the validity bit (C-bit) of that digital word is set to a logic zero and a new parity bit is generated before the digital word is transmitted to duplex link interface 69. Accordingly, the validity bits of the digital words transmitted by each of the time-multiplexed switches 10 and 10' indicate whether parity errors have been detected as the digital words have been conveyed through that time-multiplexed switch. Checking parity and regenerating correct parity twice within each of the time-multiplexed switches 10 and 10' allows the locations of faults which result in parity errors to be more accurately determined.

In accordance with the present example, the control words transmitted by control unit 17 on conductor 91 pass through duplex link interface 69 and time-multiplexed switch 10 to control distribution unit 31 and the control words transmitted by control unit 17 on conductor 92 pass through duplex link interface 69' and time-multiplexed switch 10' to control distribution unit 31'. In a typical example, the control link through time-multiplexed switch 10 may be used for messages concerning call processing and the control link through time-multiplexed switch 10' may be used for administrative and maintenance messages. The flow of control messages from control distribution units 31 and 31' to active control unit 17 is substantially the reverse of the sequence just described. Call processing related control words destined for control unit 17 are transmitted from control distribution unit 31 to time-multiplexed switch 10 and placed in time slot TS1 on 256-channel time-multiplexed line 15. Similarly, administrative and maintenance related control words destined for control unit 17 are transmitted from control distribution unit 31', to time-multiplexed switch 10' and placed in time slot TS2 on 256-channel time-multiplexed line 16'. Logic zeroes are inserted in time slot TS2 on 256-channel time-multiplexed line 16 and in time slot TS1 on 256-channel time-multiplexed line 15'. The control words received from time-multiplexed switch 10—in the present example, a call processing related control word in time slot TS1 on line 15 and a logic zero in time slot TS2 on line 16—are extracted by duplex link interface 69 and transmitted to both control units 17 and 17' on conductors 93 and 94. Duplex link interface 69' similarly extracts the control words from time-multiplexed switch 10'—in the present example, a logic zero in time slot TS1 on line 15' and an administrative or maintenance related control word in time slot TS2 on line 16'—and transmits them to both control units 17 and 17' on conductors 93' and 94'. Control unit 17 selects two of the four conductors 93, 94, 93' and 94' upon which the call processing related control word and the administrative or maintenance related control word are transmitted from duplex link interfaces 69 and 69', respectively—in the present example conductors 93 and 94'. Control unit 17' is similarly capable of selecting two of the four conductors 93, 94, 93' and 94' when it is in the active mode.

Duplex link interface 69 combines the data words on 256-channel lines 15 and 16 and transmits them to time-slot interchange units 11 and 11' on 512-channel time-multiplexed line 70. Similarly, duplex link interface 69' combines the data words on 256-channel lines 15' and 16' and transmits the combined data stream to time-slot interchange units 11 and 11' via 512-channel time-multiplexed line 70'. The data words on time-multiplexed lines 70 and 70' are considered as word pairs. For example, the data word in channel 48 on line 70 and the data word in channel 48 on line 70' comprise one word pair. The corresponding data words of each word pair should both result from the same data word transmitted from a line unit. Active time-slot interchange unit 11 selects from each received word pair one data word that is used for further transmission to subscriber sets. This selection is based on the validity and parity bits of the received data words. In the present embodiment, time-slot interchange unit 11 is initially prebiased to select only the data words received on time-multiplexed line 70. Time-slot interchange unit 11 continues to select data words from line 70 until a data word received in a given channel on line 70, e.g., channel 48, either is received with incorrect parity or is received with a logic zero validity bit indicating that a parity error was detected within time-multiplexed switch 10. However, only when the other data word of the word pair—the data word in corresponding channel 48 on line 70'—is received with both correct parity and a logic one validity bit, is the data word on line 70' rather than the data word on line 70 selected for further transmission. Time-slot interchange unit 11 continues to select data words from line 70 in the channels other than channel 48 as long as those data words continue to have correct parity and logic one validity bits. However, once time-slot interchange unit 11 selects the data word in channel 48 of line 70', it will continue to select the data words in channel 48 of line 70' until one of those data words either is received with incorrect parity or is received with a logic zero validity bit. In that event, if the data word in channel 48 of line 70 is received with both correct parity and a logic one validity bit, the data word on line 70 is selected for further transmission. Thereafter, time-slot interchange unit 11 again continues to select the data words in channel 48 of line 70 as long as those data words continue to have correct parity and logic one validity bits. In accordance with the present invention, each data word transmitted by an originating time-slot interchange unit is conveyed by both time-multiplexed switches 10 and 10'. Advantageously, system faults or transient error conditions not simultaneously affecting data words from both time-multiplexed switches 10 and 10' will not result in the use of any erroneous data words for further transmission to subscriber sets. Standby time-slot interchange unit 11' performs a substantially identical data word selection operation to that of active time-slot interchange unit 11 and a comparison of the data words selected by the two units 11 and 11' is used to verify the correct data word selection operation of active unit 11. Although both time-slot interchange units 11 and 11' transmit data words to each line unit, e.g., 19 and 20, the line units select data words from the active time-slot interchange unit 11 for transmission to subscriber sets.

In the present embodiment, control links are maintained from control unit 17 to both control distribution units 31 and 31'—the link to control distribution unit 31 being via duplex link interface 69 and time-multiplexed switch 10 and the link to control distribution unit 31' being via duplex link interface 69' and time-multiplexed switch 10'. In the event that time-multiplexed switch 10 fails, central control 30 can still communicate with control unit 17 via control distribution unit 31', time-multiplexed switch 10', and duplex link interface 69'. In a typical scenario, central control 30 sends a message to control unit 17 indicating the failed status of time-multiplexed switch 10. Active time-slot interchange unit 11 is controlled by control unit 17 such that only the data words on line 70' from duplex interface 69' are selected for transmission to subscriber sets. Under this circumstance, two control links can be maintained between control unit 17 and control distribution unit 31' via duplex link interface 69' and time-multiplexed switch 10'.

DETAILED DESCRIPTION

Figure 3:
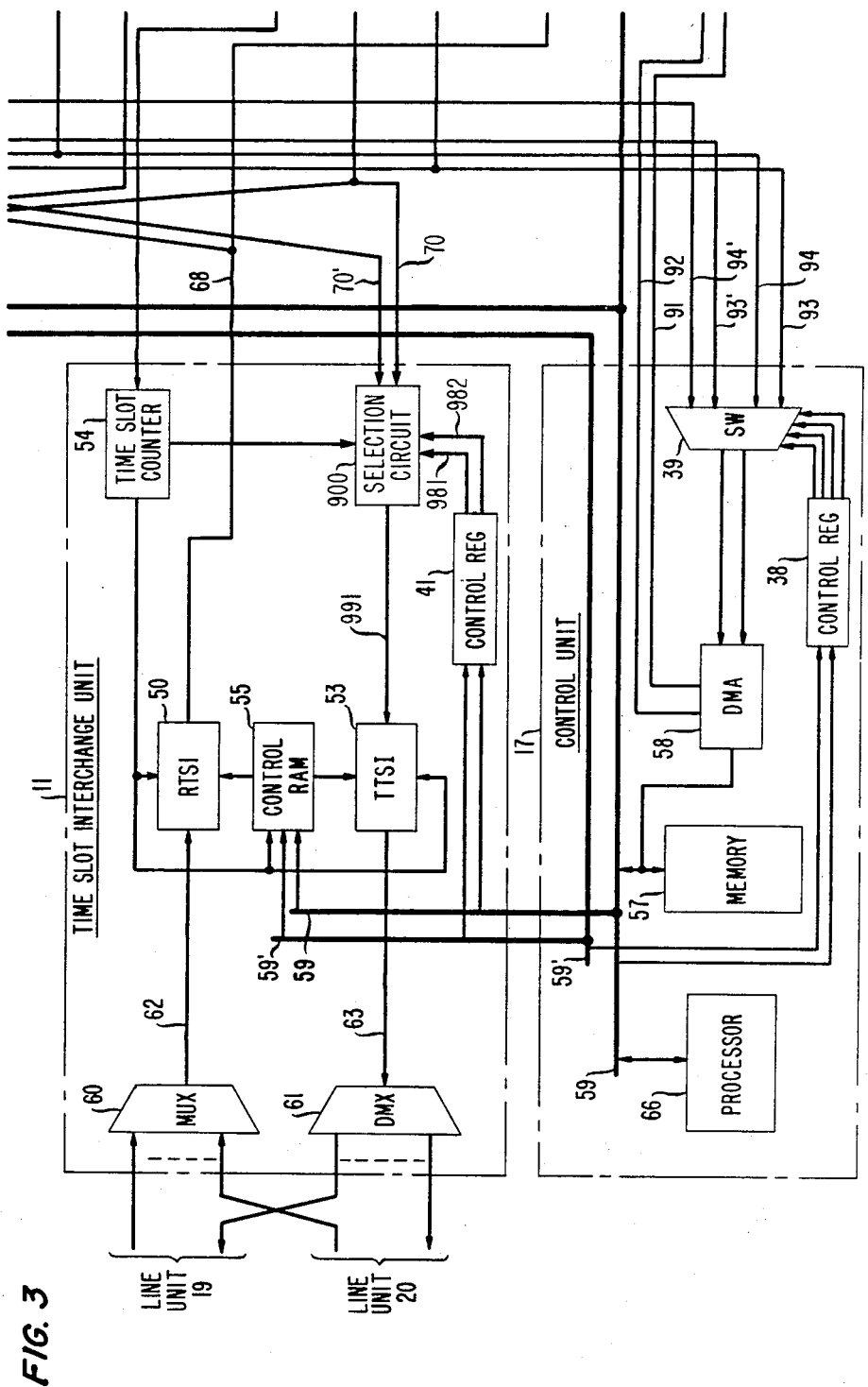
FIG. 3 through 6, when arranged in accordance with FIG. 18, present a more detailed diagram of portions of the system shown in FIG. 1 and 2.

FIG. 3 through 6, when arranged in accordance with FIG. 18, show time-slot interchange units 11 and 11', control units 17 and 17', duplex link interfaces 69 and 69' and the interconnections therebetween in greater detail. Since time-slot interchange unit 11 and control unit 17 shown in FIG. 3 are respectively substantially identical to time-slot interchange unit 11' and control unit 17' shown in FIG. 5, corresponding component parts are identified by the same number in both FIG. 3 and FIG. 5. Similarly, corresponding component parts of substantially identical duplex link interfaces 69 and 69', shown in FIG. 4 and FIG. 6, respectively, are identified by the same number in both of those figures. In the description which follows, reference to a particular component is made by including a parenthetical reference to the appropriate figure. The portion of the arrangement shown in FIG. 3 through 6 used to transmit digital words to time-multiplexed switches 10 and 10' is referred to herein as an originating communication unit. The portion of that arrangement used to receive digital words from time-multiplexed switches 10 and 10' is referred to as a destination communication unit.

Since time-slot interchange units 11 and 11' are substantially identical, only unit 11 (FIG. 3) is described herein. The output of each of eight line units, e.g., 19, 20, consists of recurring frames each comprising 64 digital channels of 16 bits each. This information is transmitted to a multiplexer 60 within time-slot interchange unit 11. Multiplexer 60 receives the output signals from the eight line units which signals are reformatted and transmitted on an output time-multiplexed line 62 having 512 channels for each 125-microsecond frame. Similarly, a demultiplexer 61 receives 512 channels of 16-bits each on a time-multiplexed line 63 from a transmit time-slot interchanger 53 which channels are distributed in a predetermined arrangement to the eight line units. The information transmitted in a given channel on time-multiplexed line 62 is stored in a receive time-slot interchanger 50 in a memory location uniquely associated with that given channel.

The particular memory location into which a given data word is stored is defined by time-slot designation signals generated by a time-slot counter 54. Time-slot counter 54 generates a recurring sequence of 512 time-slot designations at the rate of one time-slot designation per time slot. The particular time-slot designation generated during the time slot in which a given data word is received defines the memory location within receive time-slot interchanger 50 which is to store that data word. Data words are also read from receive time-slot interchanger 50 at the rate of one data word per time slot. The memory address of the data word to be read from receive time-slot interchanger 50 during a given time slot is obtained by reading a control RAM 55. Control RAM 55 is read once per time slot at an address defined by the time-slot designation from time-slot counter 54 and the quantity so read is transmitted to receive time-slot interchanger 50 as the read address for that time slot. Data words read from receive time-slot interchanger 50 are transmitted to duplex link interfaces 69 (FIG. 4) and 69' (FIG. 6) via time-multiplexed line 68. Data words from duplex link interfaces 69 and 69' are received by a selection circuit 900 (FIG. 3) on 512-channel time-multiplexed lines 70 and 70'. Recall that the data words in corresponding channels on time-multiplexed lines 70 and 70' are considered as word pairs. Selection circuit 900 (FIG. 3) selects from each received word pair one data word and transmits the selected data word on a 512-channel time-multiplexed line 991 to transmit time-slot interchanger 53 (FIG. 3). Processor 66 of active control unit 17 (FIG. 3) initializes selection circuit 900 by writing two bits—an enable bit and a line select bit—into a control register 41 (FIG. 3). When the enable bit of control register 41 is a logic one, selection circuit 900 is enabled to select data words from lines 70 and 70' based on the validity and parity bits of the received data words and the line select bit of control register 41 defines only the first line selections made by selection circuit 900 after initialization. However, when the enable bit of control register 41 is a logic zero, selection circuit 900 continuously selects only data words from the time-multiplexed line 70 or 70' defined by the line select bit of control register 41. The operation of selection circuit 900 (FIG. 8) is described in more detail later herein. The data words transmitted by selection circuit 900 on time-multiplexed line 991 are stored by transmit time-slot interchanger 53 (FIG. 3) in locations defined by addresses from control RAM 55 (FIG. 3). Each data word is read from transmit time-slot interchanger 53 (FIG. 3) at an address defined by time-slot counter 54 (FIG. 3). Data words so read are transmitted on time-multiplexed line 63 for transmission to line units. It should be noted that control RAM 55 (FIG. 3) may be implemented as a number of control memories each associated with a particular circuit, e.g., transmit time-slot interchanger 53 (FIG. 3). The particular configuration of control memories is not important to the present invention and may vary depending on timing and circuitry requirements within time-slot interchange unit 11 (FIG. 3). The general principles of time-slot interchange as performed by receive time-slot interchanger 50, control RAM 55, time-slot counter 54 and transmit time-slot interchanger 53 are well known in the art and are not described in greater detail herein. One arrangement for reading and writing data words in time-slot memories is described in detail in U.S. Pat. No. 4,035,584, J. W. Lurtz.

Figure 4:
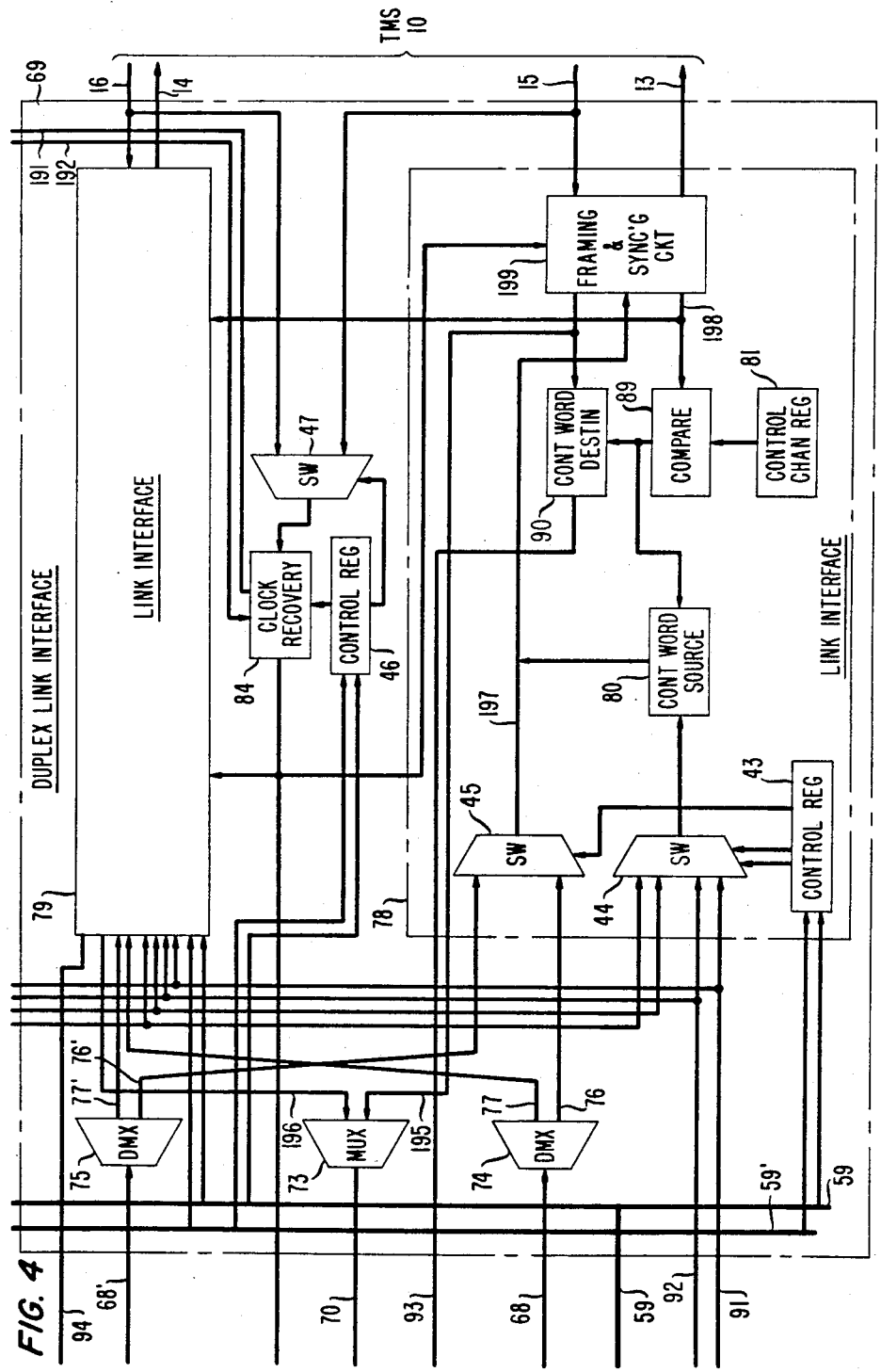
Figure 5:
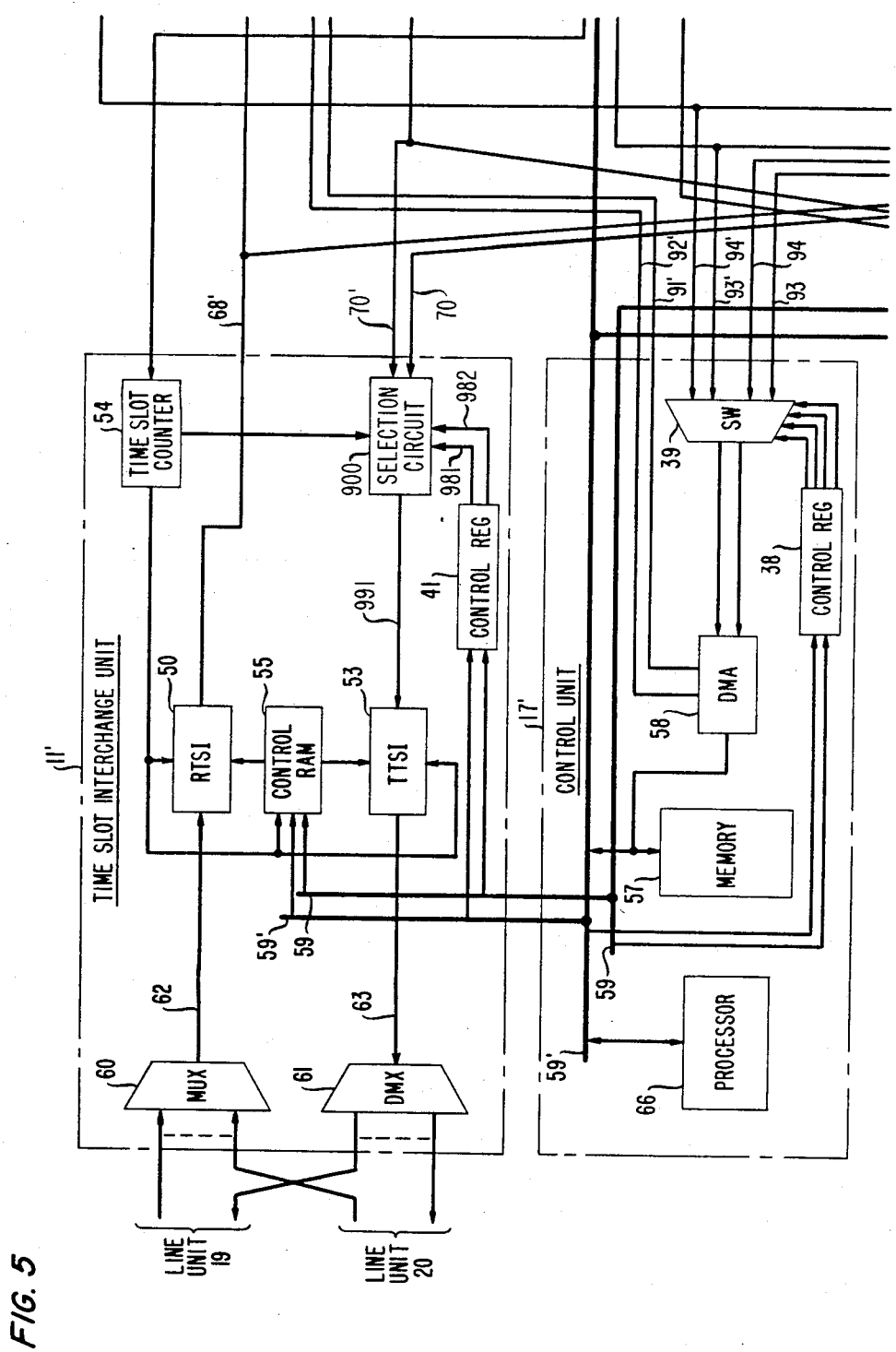
Figure 6:
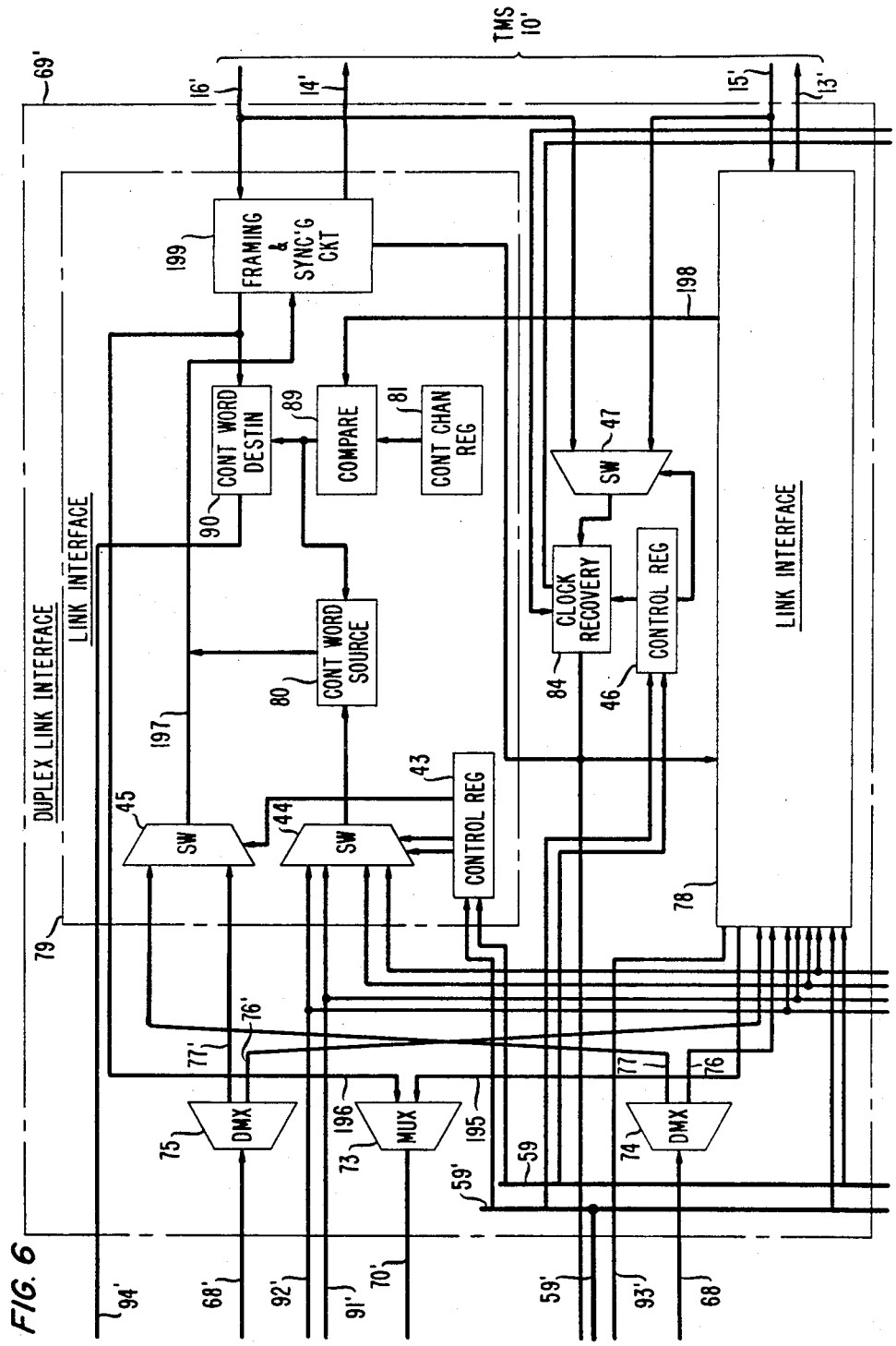

The following is a description of the primary mode of communication between the various control entities of the switching system. Consistent with the present example, assume that time-slot interchange unit 11 and control unit 17 are designated active and that time-slot interchange unit 11' and control unit 17' are designated standby. Processor 66 of active control unit 17 (FIG. 3), in response to a complete dialed number, performs translations with regard to that dialed number and formulates a call processing message for central control 30 (FIG. 2) so that idle time slots for the call can be established through time-multiplexed switches 10 and 10' (FIG. 2). Processor 66 (FIG. 3) may also formulate an administrative or maintenance message. These control messages are stored in memory 57 (FIG. 3) by processor 66 (FIG. 3). A direct memory access (DMA) unit 58 (FIG. 3) of a type well known in the art reads each of the messages at the rate of one control word per frame. DMA unit 58 (FIG. 3) transmits each call processing control word to two link interfaces 78 and 79 in each duplex link interface 69 (FIG. 4) and 69' (FIG. 6) via a conductor 91. Similarly, DMA unit 58 (FIG. 3) transmits each administrative or maintenance control word to link interfaces 78 and 79 in each duplex link interface 69 (FIG. 4) and 69' (FIG. 6) via a conductor 92. Conductors 91 and 92 are connected to two of four input terminals of each of four switches 44, one switch 44 being included in each link interface 78 and 79 in each duplex link interface 69 (FIG. 4) and 69' (FIG. 6). (Only two of the four switches 44 are shown in FIG. 4 and 6.) The other two input terminals of each switch 44 (FIG. 4 and 6) are connected to DMA unit 58 in standby control unit 17' (FIG. 5) via two conductors 91' and 92', which are used to transmit control messages when control unit 17' is active and which transmit logic zeroes when control unit 17' is standby. Each switch 44 (FIG. 4 and 6), controlled by two bits in an associated control register 43 (FIG. 4 and 6), selects one of the four conductors 91, 92, 91' and 92' to be connected to a control word source register 80 (FIG. 4 and 6). Processor 66 of active control unit 17 (FIG. 3) writes via bus 59 the proper bits into each of the control registers 43 (FIG. 4 and 6) to determine the selections made by the associated switches 44 (FIG. 4 and 6). In accordance with the present example, conductor 91 is connected to the control word source register 80 in link interface 78 of duplex link interface 69 (FIG. 4) and conductor 92 is connected to the control word source register 80 in link interface 79 of duplex link interface 69' (FIG. 6). Similarly, conductor 91' is connected to the control word source register 80 (not shown) in link interface 78 of duplex link interface 69' (FIG. 6) and conductor 92' is connected to the control word source register 80 (not shown) in link interface 79 of duplex link interface 69 (FIG. 4). Duplex link interface 69 (FIG. 4) includes a multiplexer 73, two demultiplexers 74 and 75 and two link interfaces 78 and 79. Demultiplexer 74 (FIG. 4) is connected to receive data words from the receive time-slot interchanger 50 in time-slot interchange unit 11 (FIG. 3), via time-multiplexed line 68. Demultiplexer 75 (FIG. 4) is connected to receive data words from the receive time-slot interchanger 50 in time-slot interchange unit 11' (FIG. 5) via time-multiplexed line 68'.

Multiplexer 73 (FIG. 4) is connected to transmit data words to the transmit time-slot interchanger 53 in each of the time-slot interchange units 11 (FIG. 3) and 11' (FIG. 5) via time-multiplexed line 70. Since the relationship of time-slot interchange unit 11 (FIG. 3), multiplexer 73 (FIG. 4), demultiplexer 74 (FIG. 4) and link interfaces 78 and 79 of duplex link interface 69 (FIG. 4), is substantially identical to the relationship of time-slot interchange unit 11' (FIG. 5), multiplexer 73 (FIG. 4), demultiplexer 75 (FIG. 4) and link interfaces 78 and 79 of duplex link interface 69 (FIG. 4), only the former is described in detail herein. Recall that both time-multiplexed lines 68 and 70 convey data words at the rate of 512 channels per 125-microsecond frame. Demultiplexer 74 (FIG. 4) splits the information received on time-multiplexed line 68 into two time-multiplexed lines 76 and 77 by transmitting the data words in each even-numbered channel on time-multiplexed line 77 and by transmitting each odd-numbered channel on time-multiplexed line 76. Each of the time-multiplexed lines 76 and 77 thus conveys information at the rate of 256 channels per frame. Multiplexer 73 (FIG. 4) combines the information on two 256-channel time-multiplexed lines 195 and 196 onto the 512-channel time-multiplexed line 70. This combination occurs by alternatingly transmitting the data words from time-multiplexed lines 195 and 196 such that the data words from time-multiplexed line 195 are transmitted in the odd-numbered channels of time-multiplexed line 70 while data words from time-multiplexed line 196 are transmitted in even-numbered channels. In the present embodiment, time-multiplexed lines 76 and 195 are connected to link interface 78 (FIG. 4), and time-multiplexed lines 77 and 196 are connected to link interface 79 (FIG. 4). It should be noted that time-slot interchange unit 11 (FIG. 3) operates on the basis of 512 time slots (channels) per frame while link interfaces 78 (FIG. 4) and 79 (FIG. 4) and time-multiplexed switch 10 (FIG. 2) operate on the basis of 256 time slots (channels) per frame. Further, the channels of data words received from and transmitted to time-slot interchange unit 11 (FIG. 3) are in complete synchronism. That is, whenever a channel having a given numerical designation is received by link interface 78 (FIG. 4) from time-slot interchange unit 11 (FIG. 3), both link interfaces 78 (FIG. 4) and 79 (FIG. 4) will be receiving and transmitting channels having the same numerical designation with respect to the time-slot interchange unit 11 (FIG. 3). In order to maintain synchronism after the split, all odd-numbered channels on time-multiplexed line 68 are delayed by demultiplexer 74 (FIG. 4) so that the odd-numbered channel and the immediately following even-numbered channel are transmitted on a respective one of time-multiplexed lines 76 and 77 substantially simultaneously. Similarly, each data word from link interface 79 (FIG. 4) on time-multiplexed line 196 is delayed by multiplexer 73 such that it is transmitted on time-multiplexed line 70 immediately after the data word received by multiplexer 73 from link interface 78 (FIG. 4) on time-multiplexed line 195 substantially simultaneously therewith.

Each link interface includes a switch 45 (FIG. 4 and 6) which selects, under the control of one bit in associated control register 43 (FIG. 4 and 6), the one of two 256-channel time-multiplexed lines corresponding to the active time-slot interchange unit from which received data words are used for further transmission. (Only two of four switches 45 and two of four control registers 43 are shown in FIG. 4 and 6.) Processor 66 of active control unit 17 (FIG. 3) writes via bus 59 the proper bit into each of the control registers 43 (FIG. 4 and 6) to indicate the active status of time-slot interchange unit 11 (FIG. 3). In accordance with the present example, switch 45 (FIG. 4) selects line 76 from demultiplexer 74 (FIG. 4) rather than line 76' from demultiplexer 75 (FIG. 4). Switch 45 (FIG. 4) transmits the data words received on line 76 on a 256-channel time-multiplexed line 197 to a framing and synchronizing circuit 199 (FIG. 4). Circuit 199 includes a buffer memory (not shown) to assure that, although the data words received by link interface 78 (FIG. 4) on time-multiplexed line 15 are not necessarily in channel synchronism with the data words transmitted on time-multiplexed line 13, channel synchronism is achieved between time-multiplexed lines 197 and 195. Circuit 199 (FIG. 4) also inserts a framing bit (G-bit) into each data word transmitted on line 13 and checks the framing pattern received on line 15. The operational details concerning circuit 199 (FIG. 4), which are not important to the present invention, are given in the above-mentioned U.S. Pat. No. 4,280,217 issued to E. H. Hafer et. al.

Timing for both link interfaces 78 and 79 in duplex link interface 69 (FIG. 4) is provided by a clock recovery circuit 84 (FIG. 4), which receives the incoming bit stream from either of the two time-multiplexed lines 15 and 16, and recovers a 32.768-megahertz clock signal therefrom. A switch 47 (FIG. 4), controlled by a single bit in an associated control register 46, makes the selection of line 15 or line 16. Processor 66 of active control unit 17 (FIG. 3) writes the appropriate bit into control register 46 (FIG. 4) via bus 59. Since the framing and synchronizing circuits 199 in both link interfaces 78 and 79 in duplex link interface 69 (FIG. 4) receive a common clock signal from clock recovery circuit 84 (FIG. 4), time-multiplexed lines 195 and 196 can be maintained in synchronism even though synchronism is not required on time-multiplexed lines 15 and 16. Further, duplex link interfaces 69 (FIG. 4) and 69' (FIG. 6) are kept in synchronism by having the clock recovery circuits 84 (FIG. 4 and 6) in duplex link interfaces 69 (FIG. 4) and 69' (FIG. 6) operate in a master/slave mode. The master/slave status of each clock recovery circuit 84 (FIG. 4 and 6) is controlled by one bit in associated control register 46 (FIG. 4 and 6). A phase-locked loop (not shown) is included in each clock recovery circuit 84 (FIG. 4 and 6). When clock recovery circuit 84 in duplex link interface 69 (FIG. 4) is master, it transmits a timing signal to the phase-locked loop of slave clock recovery circuit 84 in duplex link interface 69' (FIG. 6) on a conductor 191 to maintain synchronism. Similarly, when clock recovery circuit 84 in duplex link interface 69' (FIG. 6) is master, it transmits a timing signal to the phase-locked loop of slave clock recovery circuit 84 in duplex link interface 69 (FIG. 4) on a conductor 192. The synchronized clock signals recovered by the clock recovery circuits 84 (FIGS. 4 and 6) drive the time-slot counters 54 (FIGS. 3 and 5) and, therefore, the operation of active time-slot interchange unit 11 (FIG. 3) and standby time-slot interchange unit 11' (FIG. 5) is also synchronized.

Recall that, in the present example, switch 45 (FIG. 4) selects the data words incoming from active time-slot interchange unit 11 (FIG. 3) for transmission to framing and synchronizing circuit 199 (FIG. 4) on 256-channel time-multiplexed line 197. However, the contents of control word source register 80 (FIG. 4) are placed in the predetermined control time slot on line 197. For example, in link interface 78 of duplex link interface 69 (FIG. 4) the call processing related control word received on conductor 91 from DMA unit 58 of control unit 17 (FIG. 3) is placed in time slot TS1 on line 197 (FIG. 4).

The same channel is used in a given link interface to both transmit and receive control messages. The particular channel used by a given link interface to convey control messages is preset and stored in a control channel register 81 (FIGS. 4 and 6). A read address generator (not shown) in framing and synchronizing circuit 199 in link interface 78 (FIGS. 4 and 6) generates a recurring sequence of 256 read addresses in synchronism with the outgoing data words on 256-channel time-multiplexed line 195 for use by both link interfaces 78 and 79 in a given duplex link interface 69 (FIG. 4) or 69' (FIG. 6). Each read address generated by the read address generator of duplex link interface 69 (FIG. 4) is transmitted on a conductor 198 to a comparator 89 (FIG. 4) which compares that read address to the preset control channel designation stored in control channel register 81 (FIG. 4). When comparator 89 (FIG. 4) determines that the instant read address is identical to the control channel designation, it generates a gating signal which is transmitted to control word source register 80 (FIG. 4) and to a control word destination register 90 (FIG. 4). Control word source register 80 (FIG. 4) responds to the gating signal from comparator 89 (FIG. 4) by gating its contents out to time-multiplexed line 197, thus transmitting the control word. Control word destination register 90 (FIG. 4), in response to the gating signal from comparator 89 (FIG. 4), stores the information on time-multiplexed line 195. During that particular channel, the information on time-multiplexed line 195 comprises the contents of the control channel to be utilized by the control unit 17 (FIG. 3). Before the occurrence of the next control channel, the contents of the control word destination register 90 in link interface 78 of duplex link interface 69 (FIG. 4) are transmitted to both control units 17 (FIG. 3) and 17' (FIG. 5) on a conductor 93. Similarly, the contents of the control word destination registers 90 in link interface 79 of duplex link interface 69 (FIG. 4) and in link interfaces 78 and 79 of duplex link interface 69' (FIG. 6) are transmitted to both control units 17 (FIG. 3) and 17' (FIG. 5) on corresponding conductors 94, 93' and 94'. A switch 39 (FIG. 3), included in control unit 17, selects, under the control of four bits in an associated control register 38 (FIG. 3), any two of the four conductors 93, 94, 93' and 94' to be connected to two input terminals of DMA unit 58 (FIG. 3). Processor 66 of active control unit 17 (FIG. 3) writes the appropriate bits into control register 38 (FIG. 3) via bus 59. In accordance with the present example, conductors 93 and 94' are selected and a call processing related control word from link interface 78 of duplex link interface 69 (FIG. 4) and an administrative or maintenance related control word from link interface 79 of duplex link interface 69' (FIG. 6) are transmitted to memory 57 (FIG. 3) by the operation of DMA unit 58 (FIG. 3). Control unit 17' (FIG. 5) also includes a switch 39 (FIG. 5) and a control register 38 (FIG. 5) for use when control unit 17' (FIG. 5) is active.

Time-slot interchange units 11 (FIG. 3) and 11' (FIG. 5), control units 17 (FIG. 3) and 17' (FIG. 5), and duplex link interfaces 69 (FIG. 4) and 69' (FIG. 6) are referred to collectively as an interface module. The configuration of data paths and control links, the time slot interchange function of both time-slot interchangers 11 (FIG. 3) and 11' (FIG. 5) and the source of timing within the interface module is controlled by processor 66 of active control unit 17 (FIG. 3) via a bus 59. Processor 66 can control the state of each of the switches 39, 44, 45, 47 (FIGS. 3 through 6) throughout the interface module and the operation of each of the selection circuits 900 (FIGS. 3 and 5) by writing in the appropriate one of the control registers 38, 41, 43 and 46 (FIGS. 3 through 6). When control unit 17' (FIG. 5) is active, its processor 66 can also write in the control registers 38, 41, 43, and 46 (FIGS. 3 through 6) throughout the interface module via a bus 59'.

In accordance with the present example, one control link is maintained from processor 66 of active control unit 17 (FIG. 3) to time-multiplexed switch 10 (FIG. 2) via conductors 91 and 93 and link interface 78 of duplex link interface 69 (FIG. 4) and one control link is maintained from processor 66 of active control unit 17 (FIG. 3) to time-multiplexed switch 10' (FIG. 2) via conductors 92 and 94' and link interface 79 of duplex link interface 69' (FIG. 6). In the event of a failure of time-multiplexed switch 10 (FIG. 2), a message is sent to processor 66 of active control unit 17 (FIG. 3) via the control link through time-multiplexed switch 10' (FIG. 2) and link interface 79 of duplex link interface 69' (FIG. 6). In response to this message, processor 66 of active control unit 17 (FIG. 3) writes into the control register 43 (not shown) in link interface 78 of duplex link interface 69' (FIG. 6) and into control register 38 of control unit 17 (FIG. 3) such that a second control link from processor 66 of control unit 17 (FIG. 3) to time-multiplexed switch 10' (FIG. 2) is established via conductors 91 and 93' and link interface 78 of duplex link interface 69' (FIG. 6). Processor 66 of active control unit 17 (FIG. 3) also writes logic zero enable bits and logic one line select bits into the control registers 41 (FIG. 3 and 5) such that both time-slot interchange units 11 (FIG. 3) and 11' (FIG. 5) select only the data words received on 512-channel time-multiplexed line 70' from time-multiplexed switch 10' (FIG. 2).

Time-Multiplexed Switch 10

Figure 7:
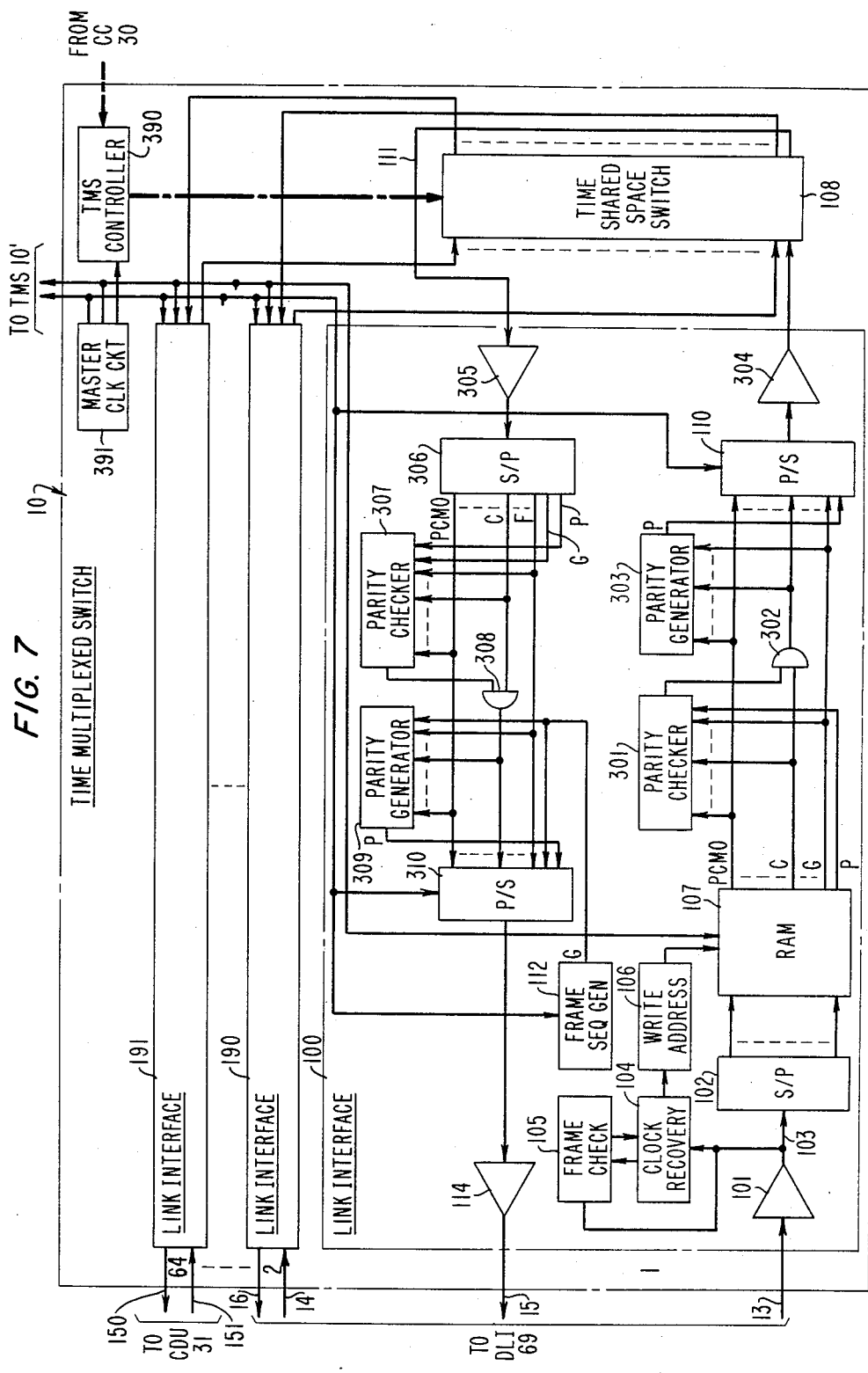
FIG. 7 is a diagram of a time-multiplexed switch included in the system of FIG. 1 and 2.

Time-multiplexed switches 10 and 10' (FIG. 2) are substantially identical. Therefore, only time-multiplexed switch 10 (FIG. 7) is described in detail herein. Each input/output port pair of time-multiplexed switch 10 is connected to a time-multiplexed switch link interface. In FIG. 7, only time-multiplexed switch link interface 100 connected to input/output port pair 1, time-multiplexed switch link interface 190 connected to input/output port pair 2 and time-multiplexed switch link interface 191 connected to input/output port pair 64 are specifically shown. Time-multiplexed switch link interface 101 includes a receiver 100 which receives digital words from time-multiplexed line 13 and transmits those digital words to a serial-parallel register 102 via a time-multiplexed line 103. The bit stream from time-multiplexed line 103 is also applied to a clock recovery circuit 104 and a frame check circuit 105 which derive clock signals therefrom and determine if frame synchronism is present, respectively. Time-multiplexed switch link interface 100 further includes a write address generator 106 which generates a sequence of write addresses in response to signals from clock recovery circuit 104. Each digital word transmitted to serial-parallel register 102 is then written in a random access memory 107 at the address generated by write address generator 106.

Time-multiplexed switch 10 also includes time-shared space division switch 108 which operates in frames of 256 time slots of approximately 488 nanoseconds each to complete paths among its input and output ports. Control information defining the switching path between the input and output ports to be connected during each time slot is stored in time-multiplexed switch controller 390 which information is read each time slot to establish those connections. Time-multiplexed switch controller 390 operates in accordance with timing signals received from a master clock circuit 391. Recall that each time slot has a numerical designation and that during a given time slot the digital word channel having the same numerical designation as the given time slot is to be switched. Accordingly, all digital words in a channel having a given numerical designation must be transmitted to the time-shared space division switch 108 during their associated time slot to avoid inaccurate switching. To this end, time-multiplexed switch 10 includes master clock circuit 391 for generating a recurring sequence of 256 read addresses which are transmitted to each random access memory of each time-multiplexed switch link interface substantially simultaneously. Master clock circuit 391 of time-multiplexed switch 10 also transmits timing signals to the time-multiplexed switch link interfaces in time-multiplexed switch 10'. Accordingly, random access memory 107 and the equivalent random access memories included in all other time-multiplexed switch link interfaces read a digital word associated with the same time slot at substantially the same time.

The parity of each digital word read from random access memory 107 is checked by a parity checker 301, which transmits a logic one signal to one input terminal of an AND gate 302 if parity is correct and transmits a logic zero signal thereto if parity is incorrect. The validity bit (C-bit) of each digital word read from random access memory 107 is transmitted to the second input terminal of AND gate 302. Thus AND gate 302 generates a logic one signal only when the validity bit (C-bit) of a given digital word read from random access memory 107 is a logic one and parity checker 301 indicates that the parity bit of the digital word is correct. A parity generator 303 computes a new parity bit based on the information portion (bits PCMO through G, FIG. 10) of th digital word from random access memory 107 but with the C-bit being replaced by the logic signal generated by AND gate 302 as a new C-bit. The digital words read from random access memory 107 but including the new C-bit generated by AND gate 302 and the new parity bit generated by parity generator 303 are transmitted to a parallel-serial register 110 from which they are transmitted via a driver circuit 304 to time-shared space division switch 108.

All digital words to be transmitted on time-multiplexed line 15 are received by a serial-parallel register 306 via a receiver 305 and a conductor 111 within one time slot of their transmission into time-shared space division switch 10B. A parity checker 307, an AND gate 308 and a parity generator 309 operate in a manner similar to that of parity checker 301, AND gate 302 and parity generator 303 to check parity and to insert new validity and parity bits in each word from serial-parallel register 306 before that word is stored by a parallel-serial register 310. Time-multiplexed switch link interface 100 further includes a frame sequence generator 112 which generates a sequence of framing bits (G-bits) at the rate of one bit per time slot. The framing bits are transmitted to parity generator 309 such that the new parity bits generated by parity generator 309 are consistent with those framing bits. The framing bits are also transmitted to parallel-serial register 310 for storage in the G-bit position. The digital words stored in parallel-serial register 310 are transmitted via a driver circuit 114 on time-multiplexed line 15. The presence of a logic one validity bit in a given digital word transmitted on time-multiplexed line 15 indicates that the digital word has been transmitted through time-multiplexed switch 10 with no parity errors being detected therein.

SELECTION CIRCUIT 900

Figure 8:
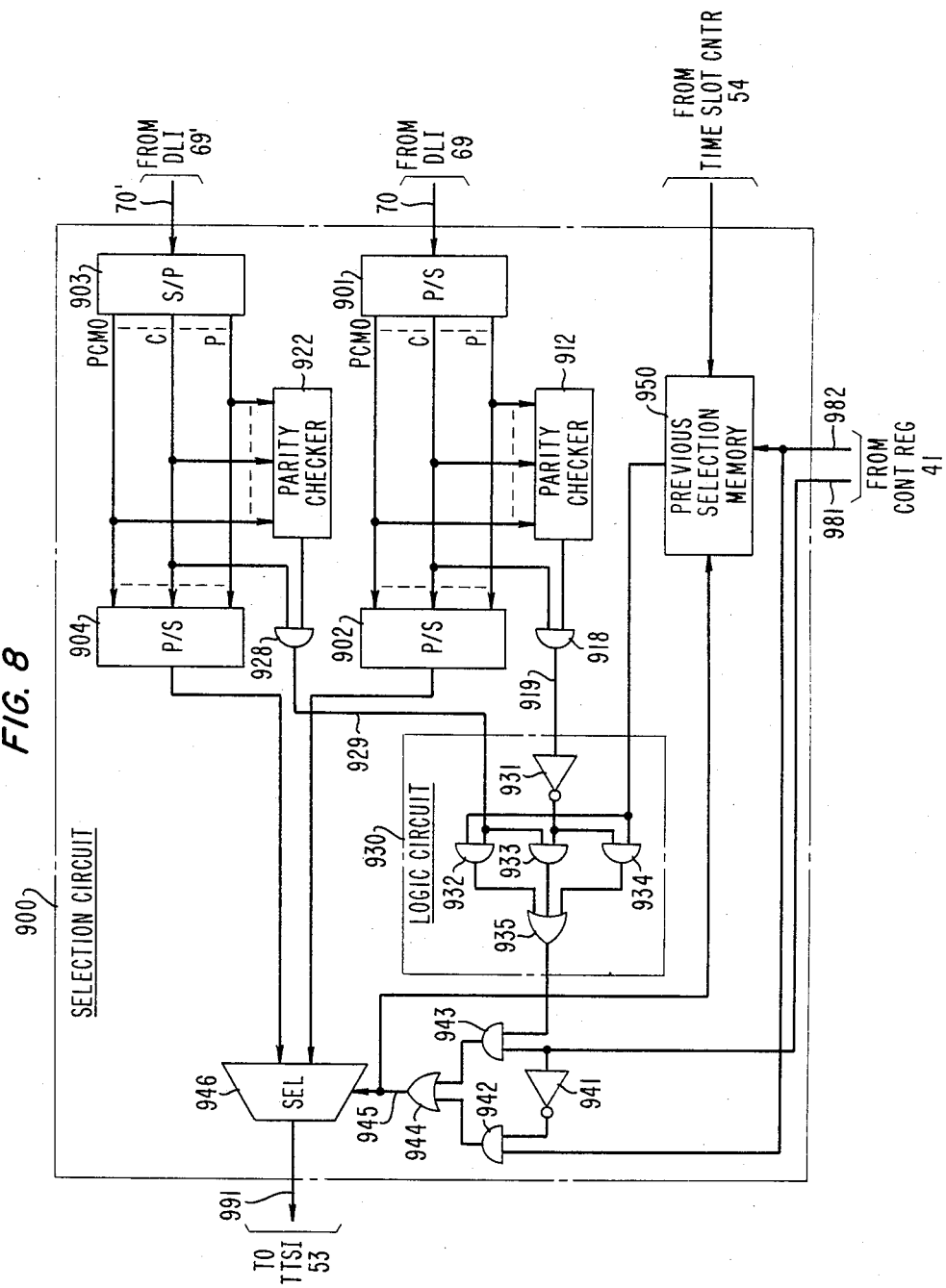
FIG. 8 is a diagram of a selection circuit included in a time-slot interchange unit shown in FIG. 3.

Recall that data words from duplex link interfaces 69 and 69' are received by selection circuit 900 (FIG. 3) on 512-channel time-multiplexed lines 70 and 70' and that the data words in corresponding channels on time-multiplexed lines 70 and 70' are considered as word pairs. Selection circuit 900 (FIG. 3) selects from each received word pair one data word and transmits the selected data word on 512-channel time-multiplexed line 991 to transmit time-slot interchanger 53 (FIG. 3). FIG. 8 is a detailed diagram of selection circuit 900. Data words received from duplex link interface 69 on time-multiplexed line 70 are conveyed via a serial-parallel register 901 and a parallel-serial register 902 to a first input terminal of a selector 946. Data words received from duplex link interface 69' on time-multiplexed line 70' are conveyed via a serial-parallel register 903 and a parallel-serial register 904 to a second input terminal of selector 946. When selector 946 receives a logic zero signal on a conductor 945, selector 946 selects the data word received from time-multiplexed line 70 for transmission to transmit time-slot interchanger 53. When selector 946 receives a logic one signal on conductor 945, selector 946 selects the data word received from time-multiplexed line 70' for transmission to transmit time-slot interchanger 53. Selection circuit 900 further includes a previous selection memory 950 comprising 512 one-bit locations. The selection signals stored in memory 950 define one of the time-multiplexed lines 70 and 70' (or equivalently, one of the time-multiplexed switches 10 and 10') for each of the 512 channels of time-multiplexed lines 70 and 70'. Each selection signal present on conductor 945 is stored in memory 950 at the location defined by the time-slot designation transmitted from time-slot counter 54 (FIG. 3). A logic zero, for example, stored in location 48 of previous selection memory 950 indicates that during the previous occurrence of channel 48, the data word on time-multiplexed line 70 from duplex link interface 69 was selected by selector 946 for transmission to transmit time-slot interchanger 53 rather than the data word on time-multiplexed 70' from duplex link interface 69'. Recall that each of the time-multiplexed lines 70 and 70' includes 512 channels in the present embodiment because each of the lines 70 and 70' conveys data words transmitted by two time-multiplexed switch output ports.

The operation of selection circuit 900 is controlled by an enable bit and a line select bit stored in control register 41 by the active one of control units 17 and 17' via bus 59 or bus 59'. When a logic zero enable bit is present in control register 41, the selection of data words from time-multiplexed lines 70 or 70' by selection circuit 900 is based only on the line select bit stored in control register 41 and not on the validity and parity bits of those data words. The logic zero enable bit present in control register 41 is transmitted by a conductor 981 to one input terminal of an AND gate 943 and to an inverter 941 connected to one input terminal of an AND gate 942. The line select bit stored in control register 41 is transmitted by a conductor 982 to the other input terminal of AND gate 942. In response, AND gate 943 transmits a logic zero signal to one input terminal of an OR gate 944 and AND gate 942 transmits a logic signal to the other input terminal of OR gate 944 having the same logic value as the line select bit. Accordingly, with a logic zero enable bit stored in control register 41, OR gate 944 transmits a logic signal to selector 946 on conductor 945 having the same logic value as the line select bit stored in control register 41. Thus, when a logic zero line select bit is stored in control register 41, selector 946 selects data words from time-multiplexed line 70. Alternatively, when a logic one line select bit is stored, selector 946 selects data words from time-multiplexed line 70'.

When a logic one enable bit is present in control register 41, the selection of data words from time-multiplexed lines 70 or 70' by selection circuit 900 is based on the validity and parity bits of those data words. The parity of each data word received on time-multiplexed line 70 and stored in serial-parallel register 901 is checked by a parity checker 912 which transmits a logic one signal to a first input terminal of an AND gate 918 when parity is correct. The validity bit (C-bit) of each data word stored in serial-parallel register 901 is transmitted to a second input terminal of AND gate 918. Accordingly, AND gate 918 transmits a logic one signal on a conductor 919 to a logic circuit 930 only when a data word stored in serial-parallel register 901 has correct parity and includes a logic one validity bit. If a data word stored in serial-parallel register 901 either has incorrect parity or includes a logic zero validity bit, AND gate 918 transmits a logic zero signal to logic circuit 930. Parity checker 922 and AND gate 928 operate in a substantially identical manner with respect to data words received on time-multiplexed line 70' and stored in serial-parallel register 903 as that of parity checker 912 and AND gate 918. Thus, AND gate 928 transmits a logic one signal on a conductor 929 to logic circuit 930 only when a data word stored in serial-parallel register 903 has correct parity and includes a logic one validity bit. AND gate 928 transmits a logic zero signal to logic circuit 930 when a data word stored in serial-parallel register 903 has incorrect parity or includes a logic zero validity bit.

The logic signals transmitted by AND gates 918 and 928 and a selection signal read from previous selection memory 950 are the three input signals to logic circuit 930 comprising an inverter 931, three AND gates 932, 933 and 934 and an OR gate 935. The truth table for logic circuit 930 is given in FIG. 9. The output signal transmitted by OR gate 935 differs from the selection signal read from previous selection memory 950 in only two instances. In the first instance, the selection signal read from memory 950 is a logic zero indicating that the data word from time-multiplexed line 70 was selected during the previous occurrence of a given channel. AND gates 918 and 928 transmit logic zero and logic one signals, respectively, indicating that the data word presently received by serial-parallel register 901 from time-multiplexed line 70 in the given channel either has incorrect parity or a logic zero validity bit and that the data word received by serial-parallel register 903 from time-multiplexed line 70' has both correct parity and a logic one validity bit. In this instance, OR gate 935 transmits a logic one signal defining time-multiplexed line 70' in accordance with the truth table of FIG. 9. In the second instance, the selection signal read from memory 950 is a logic one indicating that the data word from time-multiplexed line 70' was selected during the previous occurrence of the given channel. AND gates 928 and 918 transmit logic zero and logic one signals, respectively, indicating that the data word presently received by serial-parallel register 903 from time-multiplexed line 70' in the given channel either has incorrect parity or a logic zero validity bit and that the data word received by serial-parallel register 901 from time-multiplexed line 70 has both correct parity and a logic one validity bit. In this instance, OR gate 935 transmits a logic zero signal defining time-multiplexed line 70. In all other situations, the selection signal read from previous selection memory 950 and the output signal transmitted by OR gate 935 are the same logic value.

The logic one enable bit stored in control register 41 is transmitted by conductor 981 to one input terminal of AND gate 943 and to inverter 941 connected to one input terminal of AND gate 942. The output signal generated by OR gate 935 is transmitted to the other input terminal of AND gate 943. In response, AND gate 942 transmits a logic zero signal to one input terminal of OR gate 944 and AND gate 943 transmits a logic signal to the other input terminal of OR gate 944 having the same logic value as the output signal transmitted by OR gate 935. Accordingly, with a logic one enable bit stored in control register 41, OR gate 944 transmits a logic signal to selector 946 on conductor 945 having the same value as the output signal transmitted by the OR gate 935 of logic circuit 930. Therefore, with a logic one enable bit present in control register 41, the selection of data words from time-multiplexed lines 70 or 70' by selection circuit 900 is based on the validity and parity bits of those data words. The timing of the transmission of digital words by parallel-serial registers 902 and 904 is slightly delayed in the present embodiment. This assures that the appropriate selection signal is transmitted to selector 946 for the full duration of each digital word transmitted by the parallel-serial registers 902 and 904.

When a logic one enable bit is initially stored in control register 41 to enable selection circuit 900, the line select bit stored in control register 41 is written into all 512 locations of previous selection memory 950 to prebias the selections to be made by selection circuit 900 to one or the other of the time-multiplexed lines 70 and 70'. For example, when a logic zero line select bit is initially stored in all memory 950 locations, selection circuit 900 will continue to select data words from time-multiplexed line 70 for transmission to transmit time-slot interchanger 53 as long as those data words continue to have correct parity and logic one validity bits.

SECOND EMBODIMENT

Figure 11:
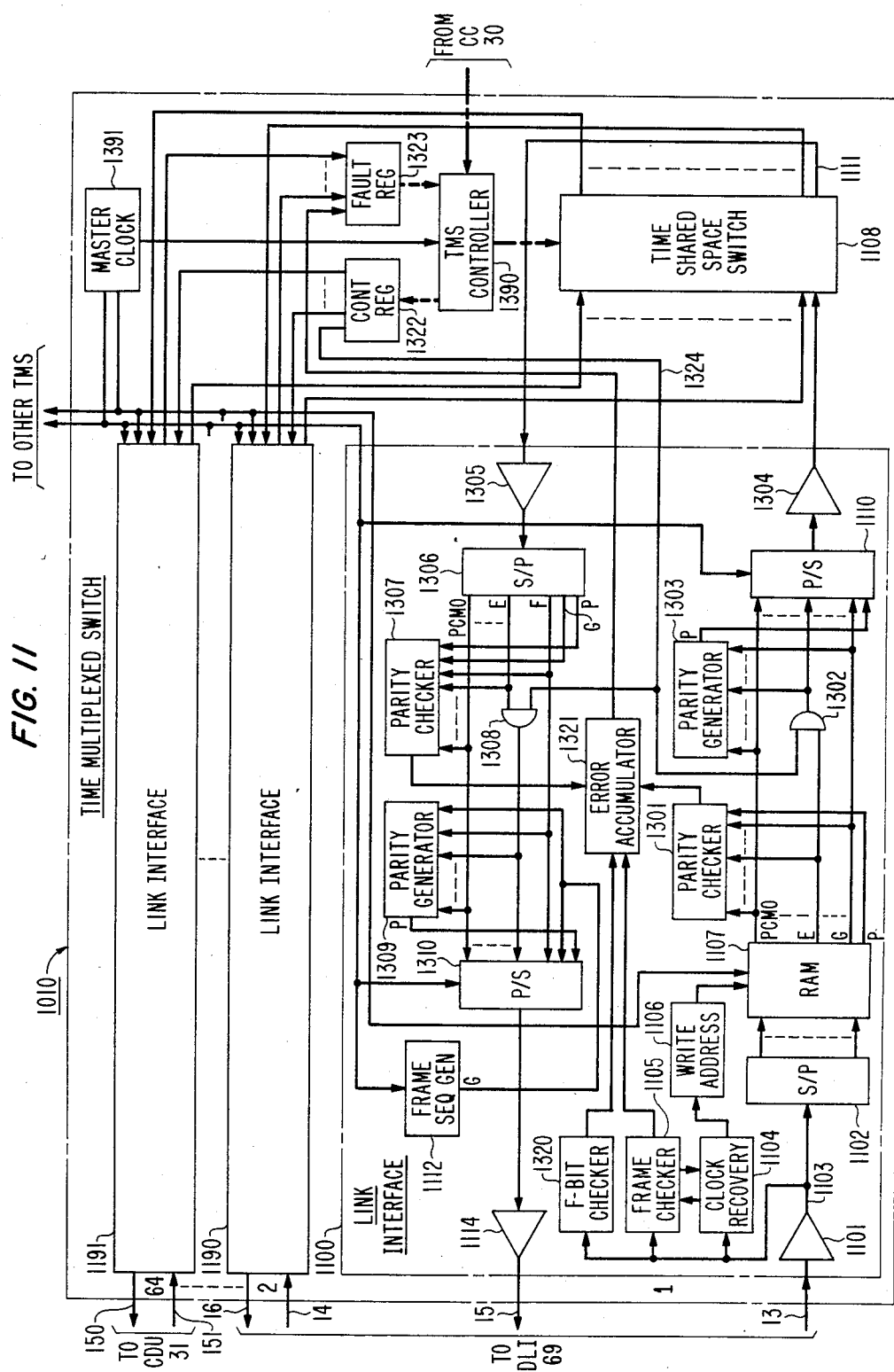
FIG. 11 is a diagram of a time-multiplexed switch used in a second embodiment of the present invention.
Figure 12:
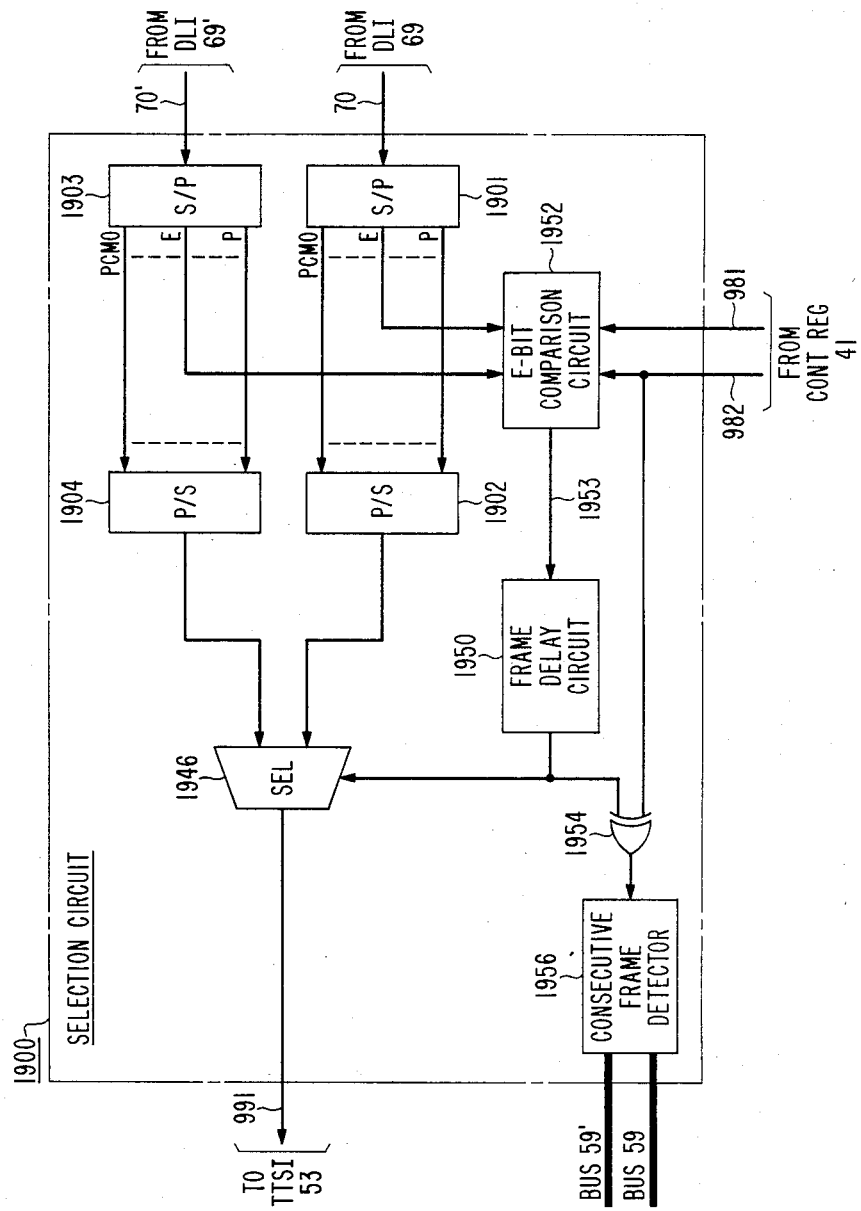
FIG. 12 is a diagram of a selection circuit used in the second embodiment of the present invention.

In accordance with a second embodiment of the present invention, each of the time-multiplexed switches 10 and 10' (FIG. 2) is replaced by a time-multiplexed switch such as time-multiplexed switch 1010 shown in FIG. 11 and each of the selection circuits 900 (FIG. 3 and 5) is replaced by a selection circuit such as selection circuit 1900 shown in FIG. 12. In this second embodiment of the invention, the digital word E-bits are used as the validity bits rather than the C-bits as in the first embodiment. Advantageously, the E-bits can also be contemporaneously used for continuity verification and signal acknowledgment as described in the above-cited Hafer Pat. No. 4,280,217. In addition the F-bit is used as a means of signaling between one of the control units, e.g., 17, and time-multiplexed switch 1010 as further described herein. As in the first embodiment, continuous operation is advantageously maintained in the presence of certain system faults without involving central control 30.

TIME-MULTIPLEXED SWITCH 1010

Time-multiplexed switch 1010 (FIG. 11) is similar in most respects to time-multiplexed switch 10 (FIG. 7) with substantially identical components thereof being designated by numbers differing by exactly 1000 and not being further described herein. However, the signals transmitted by parity checker 1301, rather than being used to modify the validity bit, which in this embodiment is the E-bit, are stored in an error accumulator 1321. The signals transmitted by parity checker 1307 are similarly stored in error accumulator 1321. Further, when framing errors are detected, frame check circuit 1105 transmits error signals to error accumulator 1321. In this second embodiment, the digital word F-bits are used by the control units, e.g., 17, to signal time-multiplexed switch 1010 of the detection of a fault condition. For example, the F-bits of the digital words transmitted on time-multiplexed line 13 are typically logic zeroes for one frame and then logic ones for the next frame. The F-bits on line 13 continue to alternate every frame unless control unit 17 detects a fault condition affecting the link comprising time-multiplexed lines 13 and 15 and link interface 78 of duplex link interface 69 in which case the per frame F-bit transitions are discontinued. In this second embodiment, an F-bit check circuit 1320 included in time-multiplexed switch link interface 1100 detects such discontinuance of the per frame F-bit transitions and transmits an indicating signal to error accumulator 1321 for storage therein. When error accumulator 1321 determines based on its stored signals that more than a predetermined number of parity errors have been detected by parity checkers 1301 or 1307 or that more than a predetermined number of framing errors have been detected by frame check circuit 1105, error accumulator 1321 transmits fault signals to fault register 1323. Error accumulator 1321 also transmits a fault signal to fault register 1323 when it determines that the discontinuance of the per frame F-bit transitions has been detected by F-bit check circuit 1320. The other time-multiplexed switch link interfaces, e.g., 1190 and 1191, can similarly transmit fault signals to fault register 1323 for storage therein. When fault register 1323 receives such a fault signal from error accumulator 1321, fault register 1323 transmits an interrupt signal to time-multiplexed switch controller 1390 which interrupts its processing to store a logic zero bit in a control register 1322. The logic zero bit stored by control register 1322 is transmitted via a conductor 1324 to one input terminal of AND gate 1302 and to one input terminal of AND gate 1308. The other input terminal of AND gate 1302 is connected to the validity bit (E-bit) location of random access memory 1107 which stores the digital words received on time-multiplexed line 13. Accordingly, AND gate 1302 thereafter transmits only logic zero validity bits (E-bits) for storage in parallel-serial register 1110 and subsequent transmission to time-shared space division switch 1108. Similarly, the other input terminal of AND gate 1308 is connected to the validity bit (E-bit) location of serial-parallel register 1306 which stores the digital words received from time-shared space division switch 1108. Accordingly, AND gate 1308 thereafter transmits only logic zero validity bits (E-bits) for storage in parallel-serial register 1310 and subsequent transmission on time-multiplexed line 15. By the operation of selection circuit 1900 as described later herein, after the storage of such a logic zero bit in control register 1322, none of the data words transmitted or received by time-multiplexed switch link interface 1100 are used for communication to subscriber sets. Storage of other logic zero bits in control register 1322 can similarly control the validity bits of the digital words conveyed by the other time-multiplexed switch link interfaces, e.g., 1190 and 1191.

SELECTION CIRCUIT 1900

Selection circuit 1900, which replaces selection circuit 900 in time-slot interchange unit 11 (FIG. 3) and time-slot interchange unit 11' (FIG. 5) in the second embodiment of the present invention, is shown in FIG. 12. Selection circuit 1900 performs the same function as selection circuit 900— selecting one data word from each word pair received on time-multiplexed lines 70 and 70'. Selection circuit 1900 includes registers 1901 through 1904 and selector 1946 which are substantially identical to registers 901 through 904 and selector 946 of selection circuit 900. However, parity is not checked in selection circuit 1900. Further, the validity bits (E-bits) stored in registers 1901 and 1903 are transmitted to an E-bit comparison circuit 1952 which operates as follows when it receives via conductor 981 a logic one enable bit stored in control register 41. If the validity bits of a given word pair received on time-multiplexed lines 70 and 70' are of the same logic value, E-bit comparison circuit 1952 transmits on a conductor 1953 to a frame delay circuit 1950 a selection signal having the same logic value as the line select bit received via conductor 982 from control register 41. If, on the other hand, the data word from time-multiplexed line 70 has a logic one validity bit (E-bit) and the data word from time-multiplexed line 70' has a logic zero validity bit (E-bit), E-bit comparison circuit 1952 transmits a logic zero selection signal on conductor 1953 defining time-multiplexed line 70. Similarly, if the data word from time-multiplexed line 70 has a logic zero validity bit (E-bit) and the data word from time-multiplexed line 70' has a logic one validity bit (E-bit), E-bit comparison circuit 1952 transmits a logic one selection signal on conductor 1953 defining time-multiplexed line 70'. However, the selection signals transmitted by E-bit comparison circuit 1952 on conductor 1953 are delayed one frame by frame delay circuit 1950 before being transmitted to selector 1946. Accordingly, the data word selections made by selector 1946 are based on the validity bits (E-bits of the word pairs received on time-multiplexed lines 70 and 70' one frame earlier. The one frame selection signal delay is used in this second embodiment to assure that the appropriate selection signal is transmitted to selector 1946 for the full duration of each digital word transmitted by the parallel-serial registers 1902 and 1904.

When a logic zero enable bit is stored in control register 41 and transmitted via conductor 981 to E-bit comparison circuit 1952, the signals transmitted on conductor 1953 by circuit 1952 are of the same logic value as that of the line select bit stored in control register 41 and conveyed to circuit 1952 by conductor 982. Accordingly, when a logic zero enable bit is present in control register 41, the data words selected by selection circuit 1900 for transmission to transmit time-slot interchanger 53 are the data words received on the time-multiplexed line 70 or 70' defined by the line select bit present in control register 41.

The line select bit stored in control register 41 is also conveyed via conductor 982 to one input terminal of an exclusive-OR gate 1954. The delayed selection signal transmitted by frame delay circuit 1950 is transmitted to the other input terminal of exclusive-OR gate 1954. Accordingly, exclusive-OR gate 1954 transmits a logic one signal to a consecutive frame detector 1956 whenever the signal transmitted by frame delay circuit 1950 to selector 1946 defining one or the other of the time-multiplexed lines 70 and 70' differs from the line select bit stored in control register 41. When consecutive frame detector 1956 determines that the signal transmitted by frame delay circuit 1950 differed from the line select bit in control register 41 during at least one time slot of 256 consecutive frames, detector 1956 stores a bit in a memory (not shown) indicating that data words from the time-multiplexed line other than that defined by the line select bit are being selected for transmission to subscriber sets. That stored bit can be read by the processor 66 of control unit 17 (FIG. 3) via bus 59 or by the processor 66 of control unit 17' (FIG. 5) via bus 59' to determine the operational status of selection circuit 1900.

THIRD EMBODIMENT

Figure 13:
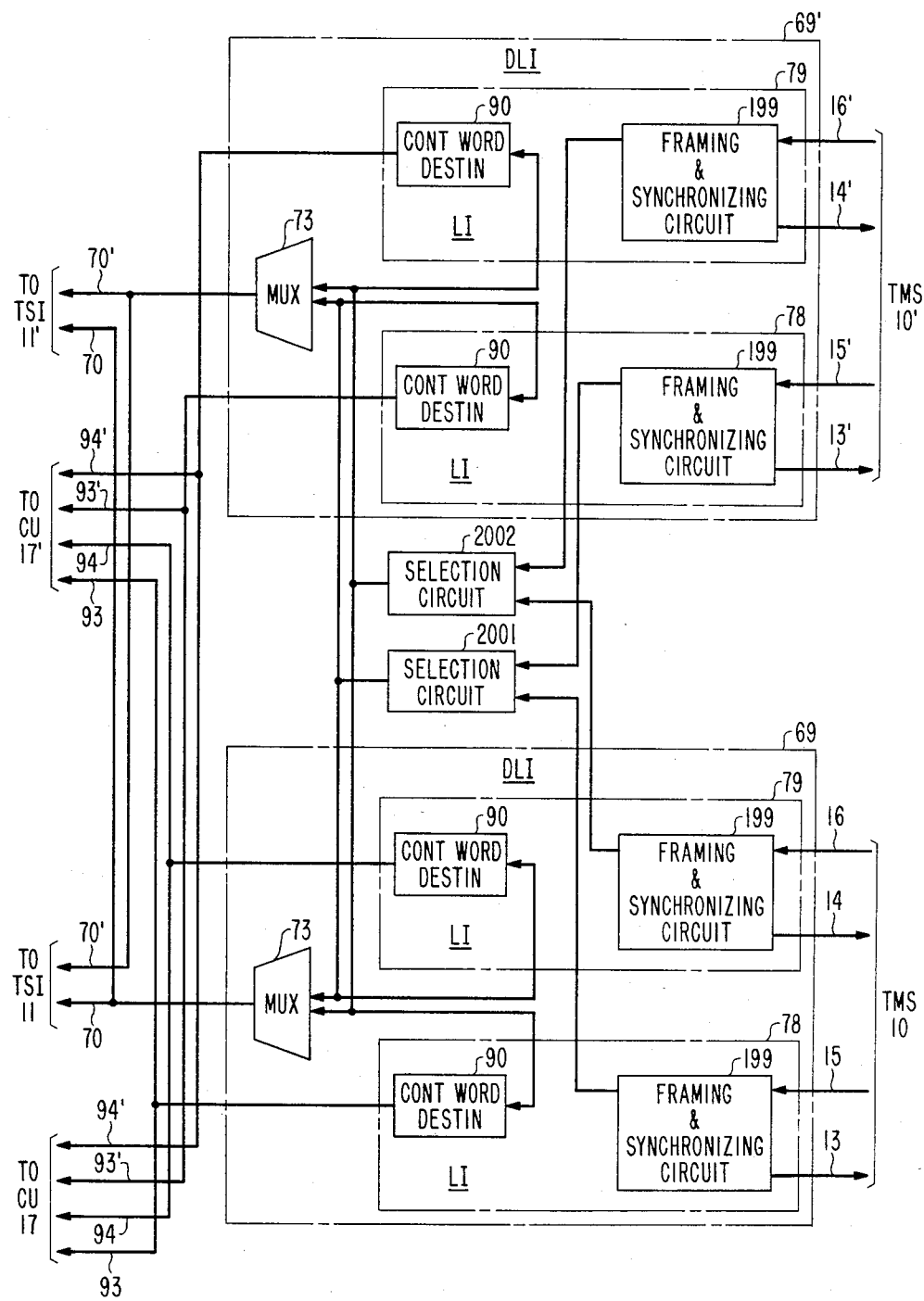
FIG. 13 and 14 are diagrams of portions of a third embodiment of the present invention.

In the two embodiments of the invention described above, the digital word selection operation is only performed on data words, i.e., digital words representing subscriber-generated information. In a third embodiment of the invention, digital word selection is also performed on the control words used to convey information among the system control entities. The third embodiment is substantially identical to the first embodiment described above and shown in FIGS. 1 through 6 with the following exceptions. Duplex link interface 69 (FIG. 4) and duplex link interface 69' (FIG. 6) are modified and two selection circuits 2001 and 2002 are included as shown in FIG. 13. FIG. 13 shows only the portions of the duplex link interfaces 69 and 69' that differ from the first embodiment. The selection circuit 900 in time-slot interchange unit 11 (FIG. 3) and the selection circuit 900 in time-slot interchange unit 11' (FIG. 5) are replaced by switches (not shown) which operate under the control of control units 17 or 17' to select time-multiplexed line 70 or 70' as the source of data words for transmit time-slot interchanger 53. The control words in this embodiment include both validity and parity bits and are transmitted in control word pairs to both time-multiplexed switches. The 256-channel selection circuit 2001 selects words from the pairs of digital words transmitted by time-multiplexed switches 10 and 10' (FIG. 2) on time-multiplexed lines 15 and 15', before control words are extracted within duplex link interfaces 69 and 69'. The 256-channel selection circuit 2002 similarly selects words from the pairs of digital words transmitted by time-multiplexed switches 10 and 10' on time-multiplexed lines 16 and 16', before control words are extracted. The digital words are selected by the two 256-channel selection circuits 2001 and 2002 based on validity and parity bits in the same manner as that of selection circuit 900 (FIG. 8) described above. The digital words selected by the two 256-channel selection circuits 2001 and 2002 are multiplexed and transmitted to both time-slot interchange units 11 and 11' (FIG. 1). Of course, only the active time-slot interchange unit uses the received digital words for further communication.

Figure 14:
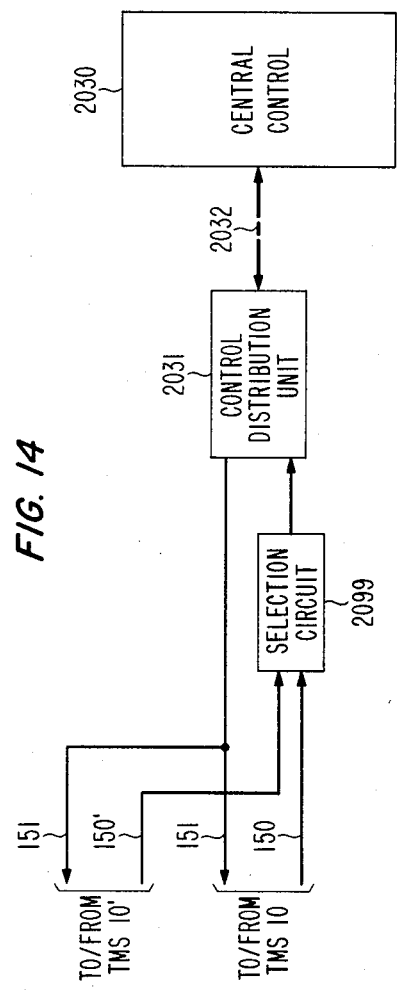

The portion of the system connected to input/output port pair 64 of time-multiplexed switch 10 and to input/output port pair 64 of time-multiplexed switch 10' in this third embodiment is shown in FIG. 14. The control words transmitted from output port 64 of time-multiplexed switch 10 on 256-channel time-multiplexed line 150 are received by a selection circuit 2099. Similarly, the control words transmitted from output port 64 of time-multiplexed switch 10' on 256-channel time-multiplexed line 150' are also received by selection circuit 2099. Selection circuit 2099 selects control words from the pairs of control words on lines 150 and 150' again based on validity and parity bits in the same manner as that of selection circuit 900 (FIG. 8) described above. The control words selected by selection circuit 2099 are transmitted to control distribution unit 2031 where they are accumulated into control messages. Control distribution unit 2031 also receives control messages from central control 2030 via a communication link 2032. Control messages received by control distribution unit 2031 including an address portion defining central control 2030 are transmitted via communication link 2032 to central control 2030. Control messages received by control distribution unit 2031 including an address portion defining one of the control units such as control units 17 or 18 are transmitted as control words on 256-channel time-multiplexed line 151 via both time-multiplexed switches 10 and 10' to the destination communication units where digital word selection is performed as described above. Although not shown in FIG. 14, this third embodiment also includes a standby control distribution unit and a standby selection circuit for selective use under the control of central control 2030. In this third embodiment, the portion of control distribution unit 2031 used to transmit control words to time-multiplexed switches 10 and 10' is also referred to as an originating communication unit. Selection circuit 2099 and the portion of control distribution unit 2031 used to receive control words from selection circuit 2099 are collectively also referred to as a destination communication unit.

FOURTH EMBODIMENT

In accordance with a fourth embodiment of the present invention, each time-multiplexed line connected from a duplex link interface to a time-multiplexed switch input port has an associated 6-bit link identifier, which in the present example, is the binary equivalent of the input port number minus one. For example, time-multiplexed lines 13 and 14 connected to input ports 1 and 2 of time-multiplexed switch 10 have the link identifiers 000000 and 000001, respectively. Similarly, time-multiplexed lines 13' and 14' connected to input ports 1 and 2 of time-multiplexed switch 10' have the link identifiers 000000 and 000001, respectively. During the establishment of a communication path from a first communication unit to a second communication unit, central control 30 transmits via the predefined control channels a communication path identity signal defining the first communication unit and the channel selected for the call, to the active control units of both the first and second communication units. After a call has been established in a given channel, the B-bit position of each word in that channel is used to transmit consecutive bits of the link identifier so that the link identifier, also referred to as a source identification signal, is repetitively transmitted every six frames. Each of the time-slot interchange units monitors the B-bit position of received data words to verify communication path continuity from the proper communication unit for each active channel. The selection of data words from time-multiplexed switches 10 or 10', in addition to being based on the validity and parity bits as in the above-described first embodiment, is also based on the receipt of the correct link identifier.

Figure 16:
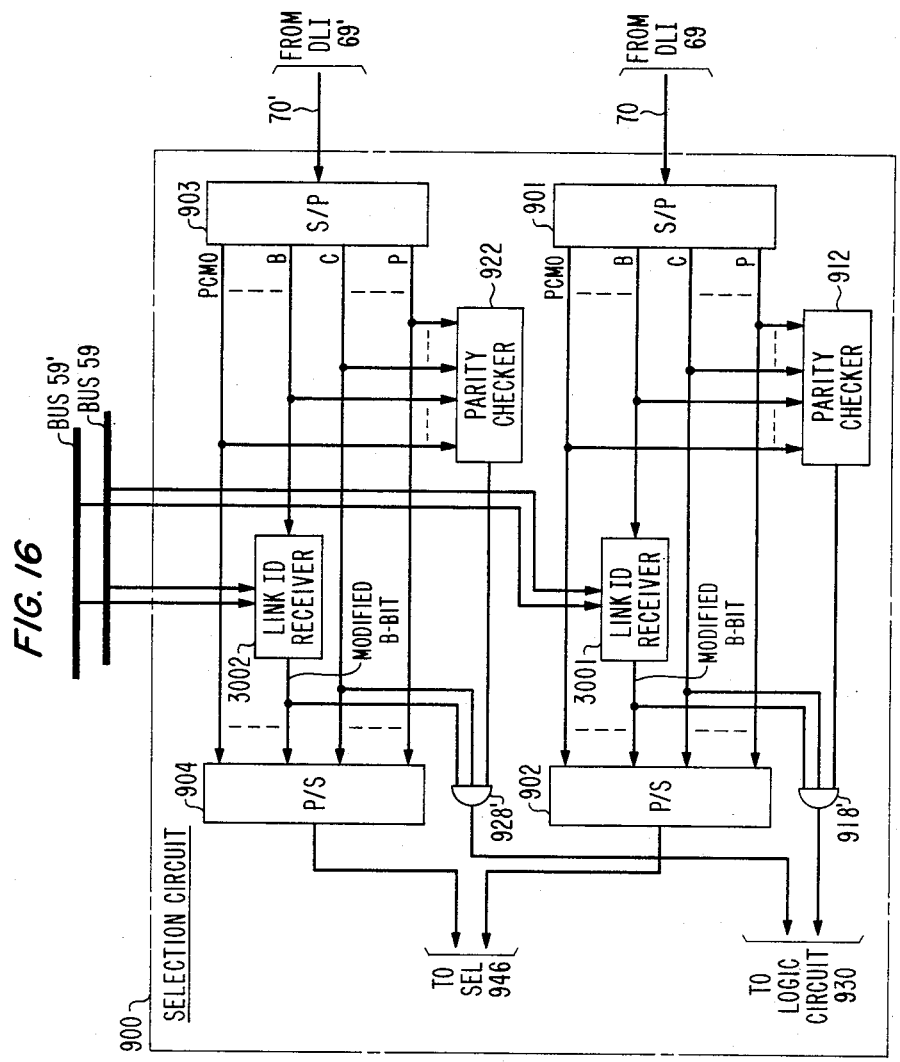

The fourth embodiment is substantially identical to the first embodiment described above and shown in FIGS. 1 through 6 with the following exceptions. Duplex link interface 69 (FIG. 4) and duplex link interface 69' (FIG. 6) are modified as shown in FIG. 15 to include four link ID transmitters 3010 to transmit the bits of the link identifiers associated with time-multiplexed lines 13, 14, 13' and 14' as well as the bits of an identifier start character to the framing and synchronizing circuits 199 which insert the received bits in the B-bit position on those lines. The selection circuits 900 in time-slot interchange units 11 (FIG. 3) and 11' (FIG. 5) are modified as shown in FIG. 16 to include two 512-channel link ID receivers 3001 and 3002 which receive the B-bits stored in serial-parallel registers 901 and 903, respectively. Link ID receiver 3001, for example, receives information from control units 17 or 17' via buses 59 or 59', respectively defining the link identifier expected in a given channel on time-multiplexed line 70. Only after the correct link identifier has been received in the given channel on line 70 as determined by comparison with the expected link identifier, does link ID receiver 3001 transmit logic one modified B-bits to parallel-serial register 902 and to AND gate 918'. In this fourth embodiment, AND gate 918' receives three input signals— the signal transmitted by parity checker 912, the validity bit (C-bit) signal as well as the modified B-bit signal. Thereafter, if link ID receiver 3001 determines that an incorrect link ID sequence has been received in the given channel, link ID receiver 3001 transmits logic zero modified B-bits to parallel-serial register 902 and to AND gate 918'. Link ID receiver 3002 operates in a similar manner with respect to registers 903 and 904 and three-input AND gate 928'. The logic signals transmitted by AND gates 918' and 928' influence the selection of data words from time-multiplexed lines 70 and 70' in the same manner as the logic signals transmitted by AND gates 918 and 928 in the first embodiment.

Two embodiments of such a communication path continuity verification arrangement in a simplex switching system are described in U.S. patent application Ser. No. 447,878, filed Dec. 8, 1982, and having the same inventor and assignee as the present application. The fourth embodiment of the present invention includes link ID transmitters and link ID receivers similar to those of FIGS. 10 and 11 of application Ser. No. 447,878 except that the link ID receivers are modified to handle 512 channels rather than 256.

It is to be understood that the above-described embodiments are merely illustrative of the principles of the invention and that other arrangements may be devised by those skilled in the art without departing from the spirit and scope of the invention.

What is claimed is:
1. An arrangement comprising
    means for transmitting digital words comprising an information portion and an error check portion derived from that information portion on both a first communication path and a second communication path, storage means for storing a selection signal defining one of said first and second communication paths, means for receiving digital words from said first and second communication paths and means responsive to a first digital word received from the one of said first and second communication paths defined by the selection signal stored by said storage means and responsive to a second digital word received from the one of said first and second communication paths not defined by the selection signal stored by said storage means, for transmitting said first digital word to a third communication path unless the error check portion of said first digital word cannot be derived from the information portion of said first digital word and the error check portion of said second digital word can be derived from the information portion of said second digital word, and transmitting said second digital word to said third communication path when the error check portion of said first digital word cannot be derived from the information portion of said first digital word and the error check portion of said second digital word can be derived from the information portion of said second digital word.

2. An arrangement in accordance with claim 1 further comprising means for modifying the selection signal stored by said storage means when a digital word received from the one of said first and second communication paths not presently defined by that selection signal, is transmitted to said third communication path.

3. An arrangement in accordance with claim 1 wherein each of said error check portions comprises a parity bit.

4. A time division switching system comprising first switching means having a plurality of input ports and a plurality of output ports for completing communication paths between said input ports of said first switching means and said output ports of said first switching means in channels comprising time slots of substantially fixed duration, second switching means having a plurality of input ports and a plurality of output ports for completing communication paths between said input ports of said second switching means and said output ports of said second switching means in channels comprising time slots of substantially fixed duration and corresponding to said channels of said first switching means, a plurality of originating communication units each comprising means for transmitting digital words comprising an information portion and an error check portion derived from that information portion to one of said input ports of said first switching means and to one of said input ports of said second switching means and a plurality of destination communication units each comprising storage means for storing for each pair of corresponding channels of said first and second switching means a selection signal defining one of said first and second switching means, means for receiving digital words from one of said output ports of said first switching means and from one of said output ports of said second switching means and means responsive to a first digital word received in a given channel from the one of said first and second switching means defined by the selection signal stored by said storage means for the pair of channels including said given channel and responsive to a second digital word received in the corresponding channel from the one of said first and second switching means not defined by the selection signal stored by said storage means for the pair of channels including said given channel, for transmitting said first digital word to a time-multiplexed line unless the error check portion of said first digital word cannot be derived from the information portion of said first digital word and the error check portion of said second digital word can be derived from the information portion of said second digital word, and transmitting said second digital word to said time-multiplexed line when the error check portion of said first digital word cannot be derived from the information portion of said first digital word and the error check portion of said second digital word can be derived from the information portion of said second digital word.

5. A time division switching system in accordance with claim 4 wherein each of said error check portions comprises a parity bit.

6. A time division switching system in accordance with claim 4 further comprising central control means for controlling said switching system, comprising means for transmitting digital words comprising control words to one of said input ports of said first switching means and one of said input ports of said second switching means via at least one of said originating communication units and means for receiving digital words comprising control words from one of said output ports of said first switching means and one of said output ports of said second switching means via at least one of said destination communication units.

7. A time division switching system in accordance with claim 4 further comprising means for establishing duplicate communication paths from said originating communication units to said destination communication units via said first and second switching means.

8. An arrangement comprising means for transmitting digital words comprising an information portion and an error check portion derived from that information portion on both a first communication path and a second communication path, the information portion of each digital word transmitted on said first and second communication paths including a validity bit, means for receiving digital words from said first communication path, first intermediate transmitter means for transmitting digital words received from said first communication path to a third communication path, means responsive to each digital word received from said first communication path having a validity bit that is a first predetermined logic value and having an error check portion that cannot be derived from the information portion of that digital word, for modifying the validity bit of that digital word transmitted by said first intermediate transmitter means to said third communication path such that the validity bit is not said first predetermined logic value, means for receiving digital words from said second communication path, second intermediate transmitter means for transmitting digital words received from said second communication path to a fourth communication path, means responsive to each digital word received from said second communication path having a validity bit that is a second predetermined logic value and having an error check portion that cannot be derived from the information portion of that digital word, for modifying the validity bit of that digital word transmitted by said second intermediate transmitter means to said fourth communication path such that the validity bit is not said second predetermined logic value, wherein said first and second predetermined logic values may be identical, means for receiving digital words from said third and fourth communication paths and means responsive to a first digital word received from said third communication path and responsive to a second digital word received from said fourth communication path, for transmitting said first digital word to a fifth communication path unless the validity bit of said first digital word is not said first predetermined logic value and the validity bit of said second digital word is said second predetermined logic value, and transmitting said second digital word to said fifth communication path when the validity bit of said first digital word is not said first predetermined logic value and the validity bit of said second digital word is said second predetermined logic value.

9. An arrangement comprising means for transmitting digital words comprising an information portion and an error check portion derived from that information portion on both a first communication path and a second communication path, the information portion of each digital word transmitted on said first and second communication path including a validity bit, means for receiving digital words from said first communication path, first intermediate transmitter means for transmitting digital words received from said first communication path to a third communication path, means responsive to each digital word received from said first communication path having a validity bit that is a first predetermined logic value and having an error check portion that cannot be derived from the information portion of that digital word, for modifying the validity bit of that digital word transmitted by said first intermediate transmitter means to said third communication path such that the validity bit is not said first predetermined logic value, means for receiving digital words from said second communication path, second intermediate transmitter means for transmitting digital words received from said second communication path to a fourth communication path, means responsive to each digital word received from said second communication path having a validity bit that is a second predetermined logic value and having an error check portion that cannot be derived from the information portion of that digital word, for modifying the validity bit of that digital word transmitted by said second intermediate transmitter means to said fourth communication path such that the validity bit is not said second predetermined logic value, wherein said first and second predetermined logic values may be identical, storage means for storing a selection signal defining one of said third and fourth communication paths, means for receiving digital words from said third and fourth communication paths and means responsive to a first digital word received from the one of said third and fourth communication paths defined by the selection signal stored by said storage means and responsive to a second digital word received from the one of said third and fourth communication paths not defined by the selection signal stored by said storage means, for transmitting said first digital word to a fifth communication path unless the validity bit of said first digital word is not said first predetermined logic value and the validity bit of said second digital word is said second predetermined logic value, and transmitting said second digital word to said fifth communication path when the validity bit of said first digital word is not said first predetermined logic value and the validity bit of said second digital word is said second predetermined logic value.

10. An arrangement in accordance with claim 9 further comprising means for modifying the selection signal stored by said storage means when a digital word received from the one of said third and fourth communication paths not presently defined by that selection signal, is transmitted to said fifth communication path.

11. An arrangement in accordance with claim 9 wherein each of said error check portions comprises a parity bit.

12. A time division switching system comprising first time-multiplexed switching means having a plurality of input ports and a plurality of output ports for completing communication paths between said input ports of said first time-multiplexed switching means and said output ports of said first time-multiplexed switching means in channels comprising time slots of substantially fixed duration, second time-multiplexed switching means having a plurality of input ports and a plurality of output ports for completing communication paths between said input ports of said second time-multiplexed switching means and said output ports of said second time-multiplexed switching means in channels comprising time slots of substantially fixed duration and corresponding to said channels of said first time-multiplexed switching means and a plurality of originating communication units each comprising means for transmitting digital words comprising an information portion and an error check portion derived from that information portion to one of said input ports of said first time-multiplexed switching means and to one of said input ports of said second time-multiplexed switching means, the information portion of each of the digital words transmitted to said input ports of said first and second time-multiplexed switching means including a validity bit, wherein said first time-multiplexed switching means comprises a first time-shared space division switch connected to said output ports of said first time-multiplexed switching means, and a plurality of
first arrangements each associated with one of said
input ports of said first time-multiplexed switching
means and each comprising
- means for receiving digital words from that associated input port,
- first intermediate transmitter means for transmitting digital words received from that associated input port to said first time-shared space division switch and
- means responsive to each digital word received from that associated input port having a validity bit that is a first predetermined logic value and having an error check portion that cannot be derived from the information portion of that digital word, for modifying the validity bit and error check portion of that digital word transmitted by the first intermediate transmitter means of that first arrangement to said first time-shared space division switch such that the validity bit is not said first predetermined logic value and such that the error check portion can be derived from the information portion, wherein said second time-multiplexed switching means comprises a second time-shared space division switch connected to said output ports of said second time-multiplexed switching means, and a plurality of second arrangements each associated with one of said input ports of said second time-multiplexed switching means and each comprising
- means for receiving digital words from that associated input port,
- second intermediate transmitter means for transmitting digital words received from that associated input port to said second time-shared space division switch and
- means responsive to each digital word received from that associated input port having a validity bit that is a second predetermined logic value and having an error check portion that cannot be derived from the information portion of that digital word, for modifying the validity bit and error check portion of that digital word transmitted by the second intermediate transmitter means of that second arrangement to said second time-shared space division switch such that the validity bit is not said second predetermined logic value and such that the error check portion can be derived from the information portion, wherein said first and second predetermined logic values may be identical and wherein said time division switching system further comprises a plurality of destination communication units each comprising
- storage means for storing for each pair of corresponding channels of said first and second time-multiplexed switching means a selection signal defining one of said first and second time-multiplexed switching means,
- means for receiving digital words from one of said output ports of said first time-multiplexed switching means and from one of said output ports of said second time-multiplexed switching means and
- means responsive to a first digital word received in a given channel from the one of said first and second time-multiplexed switching means defined by the selection signal stored by said storage means for the pair of channels including said given channel and responsive to a second digital word received in the corresponding channel from the one of said first and second time-multiplexed switching means not defined by the selection signal stored by said storage means for the pair of channels including said given channel, for transmitting said first digital word to a time-multiplexed line unless the validity bit of said first digital word is not said first predetermined logic value and the validity bit of said second digital word is said second predetermined logic value, and transmitting said second digital word to said time-multiplexed line when the validity bit of said first digital word is not said first predetermined logic value and the validity bit of said second digital word is said second predetermined logic value.

13. A time division switching system in accordance with claim 12 further comprising central control means for controlling said switching system, comprising means for transmitting digital words comprising control words to one of said input ports of said first time-multiplexed switching means and one of said input ports of said second time-multiplexed switching means via at least one of said originating communication units and means for receiving digital words comprising control words from one of said output ports of said first time-multiplexed switching means and one of said output ports of said second time-multiplexed switching means via at least one of said destination communication units.

14. A time division switching system in accordance with claim 12 further comprising means for establishing duplicate communication paths from said originating communication units to said destination communication units via said first and second time-multiplexed switching means.

15. A time division switching system comprising
- first time-multiplexed switching means having a plurality of input ports and a plurality of output ports for completing communication paths between said input ports of said first time-multiplexed switching means and said output ports of said first time-multiplexed switching means in channels comprising time slots of substantially fixed duration,
- second time-multiplexed switching means having a plurality of input ports and a plurality of output ports for completing communication paths between said input ports of said second time-multiplexed switching means and said output ports of said second time-multiplexed switching means in channels comprising time slots of substantially fixed duration and corresponding to said channels of said first time-multiplexed switching means and
- a plurality of originating communication units each comprising means for transmitting digital words comprising an information portion and an error check portion derived from that information portion to one of said input ports of said first time-multiplexed switching means and to one of said input ports of said second time-multiplexed switching means, the information portion of each of the digital words transmitted to said input ports of said first and second time-multiplexed switching means including a validity bit,
- wherein said first time-multiplexed switching means comprises a first time-shared space division switch connected to said input ports of said first time-multiplexed switching means, and a plurality of first arrangements each associated with one of said output ports of said first time-multiplexed switching means and each comprising means for receiving digital words from said first time-shared space division switch, first intermediate transmitter means for transmitting digital words received from said first time-shared space division switch to that associated output port and means responsive to each digital word received from said first time-shared space division switch having a validity bit that is a first predetermined logic value and having an error check portion that cannot be derived from the information portion of that digital word, for modifying the validity bit and error check portion of that digital word transmitted by the first intermediate transmitter means of that first arrangement to that associated output port such that the validity bit is not said first predetermined logic value and such that the error check portion can be derived from the information portion, wherein said second time-multiplexed switching means comprises a second time-shared space division switch connected to said input ports of said second time-multiplexed switching means, and a plurality of second arrangements each associated with one of said output ports of said second time-multiplexed switching means and each comprising means for receiving digital words from said second time-shared space division switch, second intermediate transmitter means for transmitting digital words received from said second time-shared space division switch to that associated output port and means responsive to each digital word received from said second time-shared space division switch having a validity bit that is a second predetermined logic value and having an error check portion that cannot be derived from the information portion of that digital word, for modifying the validity bit and error check portion of that digital word transmitted by the second intermediate transmitter means of that second arrangement to that associated output port such that the validity bit is not said second predetermined logic value and such that the error check portion can be derived from the information portion, wherein said first and second predetermined logic values may be identical and wherein said time division switching system further comprises a plurality of destination communication units each comprising storage means for storing for each pair of corresponding channels of said first and second time-multiplexed switching means a selection signal defining one of said first and second time-multiplexed switching means, means for receiving digital words from one of said output ports of said first time-multiplexed switching means and from one of said output ports of said second time-multiplexed switching means and means responsive to a first digital word received in a given channel from the one of said first and second time-multiplexed switching means defined by the selection signal stored by said storage means for the pair of channels including said given channel and responsive to a second digital word received in the corresponding channel from the one of said first and second time-multiplexed switching means not defined by the selection signal stored by said storage means for the pair of channels including said given channel, for transmitting said first digital word to a time-multiplexed line unless the validity bit of said first digital word is not said first predetermined logic value and the validity bit of said second digital word is said second predetermined logic value, and transmitting said second digital word to said time-multiplexed line when the validity bit of said first digital word is not said first predetermined logic value and the validity bit of said second digital word is said second predetermined logic value.

16. A time division switching system in accordance with claim 15 further comprising central control means for controlling said switching system, comprising means for transmitting digital words comprising control words to one of said input ports of said first time-multiplexed switching means and one of said input ports of said second time-multiplexed switching means via at least one of said originating communication units and means for receiving digital words comprising control words from one of said output ports of said first time-multiplexed switching means and one of said output ports of said second time-multiplexed switching means via at least one of said destination communication units.

17. A time division switching system in accordance with claim 16 further comprising means for establishing duplicate communication paths from said originating communication units to said destination communication units via said first and second time-multiplexed switching means.

18. A time division switching system comprising first time-multiplexed switching means having a plurality of input ports and a plurality of output ports for completing communication paths between said input ports of said first time-multiplexed switching means and said output ports of said first time-multiplexed switching means in channels comprising time slots of substantially fixed duration, second time-multiplexed switching means having a plurality of input ports and a plurality of output ports for completing communication paths between said input ports of said second time-multiplexed switching means and said output ports of said second time-multiplexed switching means in channels comprising time slots of substantially fixed duration and corresponding to said channels of said first time-multiplexed switching means and a plurality of originating communication units each comprising means for transmitting digital words comprising an information portion and an error check portion derived from that information portion to one of said input ports of said first time-multiplexed switching means and to one of said input ports of said second time-multiplexed switching means, the information portion of each of the digital words transmitted to said input ports of said first and second time-multiplexed switching means including a validity bit, wherein said first time-multiplexed switching means comprises a first time-shared space division switch connected to said output ports of said first time-multiplexed switching means, and a plurality of first arrangements each associated with one of said input ports of said first time-multiplexed switching means and each comprising means for receiving digital words from that associated input port, means for generating a first fault signal after the error check portions of at least a first predetermined number of digital words received from that associated input port cannot be derived from the information portions of those digital words, first intermediate transmitter means for transmitting digital words received from that associated input port to said first time-shared space division switch and means responsive to said first fault signal and to each digital word received from that associated input port having a validity bit that is a first predetermined logic value, for modifying the validity bit of that digital word transmitted by the first intermediate transmitter means of that first arrangement to said first time-shared space division switch such that the validity bit is not said first predetermined logic value, wherein said second time-multiplexed switching means comprises a second time-shared space division switch connected to said output ports of said second time-multiplexed switching means, and a plurality of second arrangements each associated with one of said input ports of said second time-multiplexed switching means and each comprising means for receiving digital words from that associated input port, means for generating a second fault signal after the error check portions of at least a second predetermined number of digital words received from that associated input port cannot be derived from the information portions of those digital words, wherein said first and second predetermined numbers may be equal, second intermediate transmitter means for transmitting digital words received from that associated input port to said second time-shared space division switch, means responsive to said second fault signal and to each digital word received from that associated input port having a validity bit that is a second predetermined logic value, for modifying the validity bit of that digital word transmitted by the second intermediate transmitter means of that second arrangement to said second time-shared space division switch such that the validity bit is not said second predetermined logic value, wherein said first and second predetermined logic values may be identical and wherein said time division switching system further comprises a plurality of destination communication units each comprising means for receiving digital words from one of said output ports of said first time-multiplexed switching means and one of said output ports of said second time-multiplexed switching means in pairs, one digital word of each of said pairs of digital words being received from each of said first and second time-multiplexed switching means and means responsive to the pairs of digital words received from said first and second time-multiplexed switching means for selectively transmitting to a time-multiplexed line one digital word of each of said received pairs of digital words based on the logic values of the validity bits of said received pairs of digital words.

19. A time division switching system in accordance with claim 18, wherein each of said error check portions comprises a parity bit.

20. A time division switching system in accordance with claim 18 further comprising central control means for controlling said switching system, comprising means for transmitting digital words comprising control words to one of said input ports of said first time-multiplexed switching means and one of said input ports of said second time-multiplexed switching means via at least one of said originating communication units and means for receiving digital words comprising control words from one of said output ports of said first time-multiplexed switching means and one of said output ports of said second time-multiplexed switching means via at least one of said destination communication units.

21. A time division switching system in accordance with claim 18 further comprising means for establishing duplicate communication paths from said originating communication units to said destination communication units via said first and second time-multiplexed switching means.

22. A time division switching system comprising first time-multiplexed switching means having a plurality of input ports and a plurality of output ports for completing communication paths between said input ports of said first time-multiplexed switching means and said output ports of said first time-multiplexed switching means in channels comprising time slots of substantially fixed duration, second time-multiplexed switching means having a plurality of input ports and a plurality of output ports for completing communication paths between said input ports of said second time-multiplexed switching means and said output ports of said second time-multiplexed switching means in channels comprising time slots of substantially fixed duration and corresponding to said channels of said first time-multiplexed switching means and a plurality of originating communication units each comprising means for transmitting digital words comprising an information portion and an error check portion derived from that information portion to one of said input ports of said first time-multiplexed switching means and to one of said input ports of said second time-multiplexed switching means, the information portion of each of the digital words transmitted to said input ports of said first and second time-multiplexed switching means including a validity bit, wherein said first time-multiplexed switching means comprises a first time-shared space division switch connected to said input ports of said first time-multiplexed switching means, and a plurality of first arrangements each associated with one of said output ports of said first time-multiplexed switching means and each comprising means for receiving digital words from said first time-shared space division switch, means for generating a first fault signal after the error check portions of at least a first predetermined number of digital words received from said first time-shared space division switch cannot be derived from the information portions of those digital words, first intermediate transmitter means for transmitting digital words received from said first time-shared space division switch to that associated output port and means responsive to said first fault signal and to each digital word received from said first time-shared space division switch having a validity bit that is a first predetermined logic value, for modifying the validity of that digital word transmitted by the first intermediate transmitter means of that first arrangement to that associated output port such that the validity bit is not said first predetermined logic value, wherein said second time-multiplexed switching means comprises a second time-shared space division switch connected to said input ports of said second time-multiplexed switching means, and a plurality of second arrangements each associated with one of said output ports of said second time-multiplexed switching means and each comprising means for receiving digital words from said second time-shared space division switch, means for generating a second fault signal after the error check portions of at least a second predetermined number of digital words received from said second time-shared space division switch cannot be derived from the information portions of those digital words, wherein said first and second predetermined numbers may be equal, second intermediate transmitter means for transmitting digital words received from said second time-shared space division switch to that associated output port and means responsive to said second fault signal and to each digital word received from said second time-shared space division switch having a validity bit that is a second predetermined logic value, for modifying the validity bit of that digital word transmitted by the second intermediate transmitter means of that second arrangement to that associated output port such that the validity bit is not said second predetermined logic value, wherein said first and second predetermined logic values may be identical and wherein said time division switching system further comprises a plurality of destination communication units each comprising means for receiving digital words from one of said output ports of said first time-multiplexed switching means and one of said output ports of said second time-multiplexed switching means in pairs, one digital word of each of said pairs of digital words being received from each of said first and second time-multiplexed switching means and means responsive to the pairs of digital words received from said first and second time-multiplexed switching means for selectively transmitting to a time-multiplexed line one digital word of each of said received pairs of digital words based on the logic values of the validity bits of said received pairs of digital words.

23. A time division switching system in accordance with claim 22 wherein each of said error check portions comprises a parity bit.

24. A time division switching system in accordance with claim 22 further comprising central control means for controlling said switching system, comprising means for transmitting digital words comprising control words to one of said input ports of said first time-multiplexed switching means and one of said input ports of said second time-multiplexed switching means via at least one of said originating communication units and means for receiving digital words comprising control words from one of said output ports of said first time-multiplexed switching means and one of said output ports of said second time-multiplexed switching means via at least one of said destination communication units.

25. A time division switching system in accordance with claim 22 further comprising means for establishing duplicate communication paths from said originating communication units to said destination communication units via said first and second time-multiplexed switching means.

26. An arrangement comprising first switching means having an input port and an outport for selectively establishing a communication path between that input port and that output port, second switching means having an input port and an output port for selectively establishing a communication path between that input port and that output port, a first communication unit comprising means for transmitting digital words to said input ports of said first and second switching means, a second communication unit comprising means for receiving digital words from said output ports of said first and second switching means, means for generating a communication path identity signal defining said communication paths of said first and second switching means and defining said first communication unit and means for transmitting said communication path identity signal to said first communication unit and said second communication unit, wherein said first communication unit comprises means responsive to said communication path identity signal for transmitting a source identification signal to said input ports of said first and second switching means, said source identification signal defining said first communication unit and wherein said second communication unit comprises means for receiving signals from said output ports of said first and second switching means and means responsive to said communication path identity signal for transmitting to a time-multiplexed line digital words received from said output port of said first switching means unless said source identification signal is not received from said output port of said first switching means and said source identification signal is received from said output port of said second switching means and for transmitting to said time-multiplexed line digital words received from said output port of said second switching means when said source identification signal is not received from said output port of said first switching means and said source identification signal is received from said output port of said second switching means.

* * * * *